(12) United States Patent
Oostdyk et al.

(10) Patent No.: US 10,234,129 B2
(45) Date of Patent: Mar. 19, 2019

(54) MODULAR STREET LIGHTING SYSTEM

(71) Applicant: LIGHTING SCIENCE GROUP CORPORATION, Melbourne, FL (US)

(72) Inventors: Mark Andrew Oostdyk, Cape Canaveral, FL (US); Fredric S. Maxik, Cocoa Beach, FL (US); David E. Bartine, Cocoa, FL (US); Matthew Regan, Melbourne, FL (US); Ran Zhou, Rockledge, FL (US); Addy S. Widjaja, Palm Bay, FL (US); Raymond Reynolds, Satellite Beach, FL (US)

(73) Assignee: Lighting Science Group Corporation, Cocoa Beach, FL (US)

( * ) Notice: Subject to any disclaimer, the term of this patent is extended or adjusted under 35 U.S.C. 154(b) by 0 days.

(21) Appl. No.: 14/703,809

(22) Filed: May 4, 2015

(65) Prior Publication Data
US 2016/0116152 A1   Apr. 28, 2016

Related U.S. Application Data

(60) Provisional application No. 62/068,270, filed on Oct. 24, 2014.

(51) Int. Cl.
*F21V 29/00* (2015.01)
*F21S 8/08* (2006.01)
(Continued)

(52) U.S. Cl.
CPC .............. *F21V 29/83* (2015.01); *F21K 9/20* (2016.08); *F21S 8/086* (2013.01); *F21S 9/035* (2013.01);
(Continued)

(58) Field of Classification Search
CPC ........ F21Y 2101/02; F21V 9/16; F21V 21/30; F21V 15/01; F21V 21/116; F21V 21/02;
(Continued)

(56) References Cited

U.S. PATENT DOCUMENTS

| 4,703,403 A | * | 10/1987 | Smith ..................... F21S 8/081 |
| | | | 362/268 |
| 5,963,192 A | | 10/1999 | Wong et al. |

(Continued)

FOREIGN PATENT DOCUMENTS

| DE | 202005013164 U1 | 11/2005 |
| DE | 102005059362 A1 | 9/2006 |

(Continued)

OTHER PUBLICATIONS

European Search Report for European Application No. 10161574.8 dated Sep. 8, 2010.

(Continued)

*Primary Examiner* — Alan Cariaso
*Assistant Examiner* — Mark Tsidulko
(74) *Attorney, Agent, or Firm* — Mark Malek; Stephen C. Bullock; Widerman Malek, PL

(57) ABSTRACT

A modular street lighting system comprising an attachment structure, power circuitry positioned, a support structure, and a lighting component comprising a body member comprising a light source housing section and a center component, the center component comprising a plurality of vertically-oriented heat dissipating structures, a circuit housing, circuitry, a rear attachment section, a lighting element in thermal communication, and an optic positioned within the light source housing section. The circuitry is configured to provide power for and control the operation of the lighting element. The lighting element is configured to emit light in the direction of the optic. The optic is configured to reflect (Continued)

light so as to be emitted by the lighting component. The plurality of heat dissipating structures are positioned in thermal communication with the back wall.

20 Claims, 13 Drawing Sheets

(51) Int. Cl.
| | |
|---|---|
| F21V 21/108 | (2006.01) |
| F21V 23/02 | (2006.01) |
| F21V 29/83 | (2015.01) |
| F21S 9/03 | (2006.01) |
| F21V 23/00 | (2015.01) |
| F21V 29/15 | (2015.01) |
| F21K 9/20 | (2016.01) |
| F21W 131/103 | (2006.01) |
| F21Y 115/10 | (2016.01) |

(52) U.S. Cl.
CPC ............ *F21V 23/008* (2013.01); *F21V 29/15* (2015.01); *F21W 2131/103* (2013.01); *F21Y 2115/10* (2016.08); *Y02B 20/72* (2013.01)

(58) Field of Classification Search
CPC ..... F21K 9/00; F21S 4/001; F21S 8/02; F21S 8/033; F21S 8/086; F21S 8/04; F21W 2121/00
USPC ...................... 362/84, 249.01, 368, 370, 431
See application file for complete search history.

(56) References Cited

U.S. PATENT DOCUMENTS

| | | | |
|---|---|---|---|
| 6,074,075 A * | 6/2000 | Staniec | F21V 21/38 362/249.11 |
| 6,149,283 A | 11/2000 | Conway et al. | |
| 6,150,774 A | 11/2000 | Mueller et al. | |
| 6,250,774 B1 | 6/2001 | Begemann et al. | |
| 6,517,221 B1 * | 2/2003 | Xie | H01S 5/02469 257/714 |
| 6,598,996 B1 | 7/2003 | Lodhie | |
| 6,601,984 B2 | 8/2003 | Yamamoto et al. | |
| 6,624,845 B2 | 9/2003 | Lloyd et al. | |
| 6,676,279 B1 | 1/2004 | Hubbell et al. | |
| 6,705,744 B2 | 3/2004 | Hubbell et al. | |
| 6,717,660 B1 | 4/2004 | Bernardo | |
| 6,774,916 B2 | 8/2004 | Pettitt et al. | |
| 6,811,258 B1 | 11/2004 | Grant | |
| 6,906,852 B1 | 6/2005 | Russell | |
| 6,989,983 B2 | 1/2006 | Rummey | |
| 7,014,336 B1 | 3/2006 | Ducharme et al. | |
| 7,093,956 B2 | 8/2006 | Miller et al. | |
| 7,095,056 B2 | 8/2006 | Vitta et al. | |
| 7,163,325 B2 | 1/2007 | Kojima et al. | |
| 7,369,056 B2 | 5/2008 | McCollough | |
| 7,393,124 B1 * | 7/2008 | Williams | F21V 21/36 362/403 |
| 7,547,126 B2 * | 6/2009 | Hiratsuka | F21S 4/008 362/241 |
| 7,628,508 B2 | 12/2009 | Kita et al. | |
| 7,731,383 B2 | 6/2010 | Myer | |
| 7,759,854 B2 | 7/2010 | Miller et al. | |
| 7,777,166 B2 | 8/2010 | Roberts | |
| 7,845,823 B2 | 12/2010 | Mueller et al. | |
| 7,850,321 B2 | 12/2010 | Wang et al. | |
| 7,850,335 B2 | 12/2010 | Hsu et al. | |
| 7,863,829 B2 | 1/2011 | Sayers et al. | |
| 7,909,479 B2 | 3/2011 | Rooymans | |
| 7,942,537 B2 | 5/2011 | Krijn et al. | |
| 7,959,320 B2 | 6/2011 | Mueller et al. | |
| 7,972,030 B2 | 7/2011 | Li | |
| 8,021,021 B2 | 9/2011 | Paolini | |
| 8,040,102 B2 | 10/2011 | Kao et al. | |
| 8,047,682 B2 * | 11/2011 | Zheng | F21S 8/086 362/249.01 |
| 8,061,869 B2 | 11/2011 | Lo et al. | |
| 8,096,685 B2 | 1/2012 | Lu et al. | |
| 8,100,552 B2 | 1/2012 | Spero | |
| 8,118,456 B2 | 2/2012 | Reed et al. | |
| 8,130,099 B2 | 3/2012 | Steinel et al. | |
| 8,136,969 B2 | 3/2012 | Burkett et al. | |
| 8,143,811 B2 | 3/2012 | Shloush et al. | |
| 8,147,094 B2 * | 4/2012 | Chiang | F21S 2/00 362/1 |
| 8,186,852 B2 * | 5/2012 | Dassanayake | F21K 9/135 362/231 |
| 8,193,713 B2 | 6/2012 | Jung et al. | |
| 8,256,921 B2 | 9/2012 | Crookham et al. | |
| 8,260,575 B2 | 9/2012 | Walters et al. | |
| 8,308,318 B2 | 11/2012 | Maxik et al. | |
| 8,310,144 B2 * | 11/2012 | Hoelen | C09K 11/0883 313/502 |
| 8,475,002 B2 | 7/2013 | Maxik et al. | |
| 8,491,153 B2 | 7/2013 | Maxik et al. | |
| 9,423,110 B1 * | 8/2016 | Newton | F21S 8/00 |
| 9,441,824 B2 * | 9/2016 | Kinnune | F21V 29/74 |
| 2005/0265023 A1 | 12/2005 | Scholl | |
| 2006/0056169 A1 | 3/2006 | Lodhie et al. | |
| 2007/0081339 A1 | 4/2007 | Chung et al. | |
| 2008/0043464 A1 | 2/2008 | Ashdown | |
| 2008/0055065 A1 | 3/2008 | Feldmeier | |
| 2010/0191487 A1 | 7/2010 | Rada et al. | |
| 2010/0245279 A1 | 9/2010 | Kubis et al. | |
| 2011/0260624 A1 | 10/2011 | Bigge et al. | |
| 2012/0026660 A1 | 1/2012 | Myer et al. | |
| 2012/0105228 A1 | 5/2012 | Loveland et al. | |
| 2012/0242507 A1 | 9/2012 | Nguyen et al. | |
| 2012/0286770 A1 | 11/2012 | Schröder et al. | |
| 2014/0168932 A1 | 6/2014 | Boomgaarden et al. | |
| 2015/0226410 A1 | 8/2015 | Romeu et al. | |
| 2015/0308630 A1 * | 10/2015 | Bendtsen | F21K 9/1355 362/235 |

FOREIGN PATENT DOCUMENTS

| | | |
|---|---|---|
| WO | WO 2005072279 A2 | 8/2005 |
| WO | WO 2007069185 A1 | 6/2007 |
| WO | WO 2008019481 A1 | 2/2008 |

OTHER PUBLICATIONS

Proefrock, Philip, "LED Street Lights," 18 pp., Apr. 1, 2007.
LEDs Magazine—Streetlighting; "On the verge: LEDs are ready to challenge incumbent light sources in the streetlighting market"; Oct. 2006; pp. 11-13, 16 & 17.
Swillas Engineering LTD; "Solar Street Lights"; 2005; 3 pp.
Acuity Brands Controls DD Series Diagnostics Electronic Locking Type Photocontrol, DTL Dark to Light Sheet#DTL-DD-D, undated (1 page).
USPTO Non-Final Office Action in related U.S. Appl. No. 13/465,921, issued as U.S. Pat. No. 8,475,002, dated Nov. 9, 2012 (20 pages).
USPTO Examiner's Interview Summary in related U.S. Appl. No. 13/465,921, issued as U.S. Pat. No. 8,475,002, dated Feb. 8, 2013 (3 pages).

* cited by examiner

MODULAR STREET LIGHTING SYSTEM

RELATED APPLICATIONS

This application is related and claims priority under 37 CFR 1.119 of U.S. Provisional Patent Application Ser. No. 62/068,270, which in turn is related to U.S. Pat. No. 8,475,002 titled Sustainable Outdoor Lighting System and Associated Methods filed May 7, 2012, U.S. patent application Ser. No. 14/176,542 titled Lamp Connector filed Feb. 10, 2014, and U.S. patent application Ser. No. 14/096,538 titled Modular Segmented Electronics Assembly filed Dec. 4, 2013, the contents of each of which are incorporated herein in their entirety by reference, except to the extent disclosure therein is inconsistent with disclosure herein.

FIELD OF THE INVENTION

The present invention relates to modular street lighting systems and lighting components thereof.

BACKGROUND OF THE INVENTION

Traditional cobra head street light systems offer lighting solutions with limited flexibility, particularly in regards to the ability to emit light in multiple directions from a single pole, as well as later retrofitting the pole to increase the number of light-emitting elements. Moreover, traditional LED retrofit solutions for cobra head street light systems, as well as current non-retrofit LED-based street lighting solutions, have thermal solutions that are either inadequate, resulting in the shortened lifespan and reduced efficiency of the LEDs, or require expensive active thermal solutions, reducing the electrical efficiency and long-term reliability of the solution as a result of failure of the active part, which is typically a fan. Accordingly, there is a need for an LED street lighting device that permits multiple installations of modular lighting components for emitting light in multiple directions, as well as a lighting component that has an adequate thermal dissipation capacity without relying on active cooling.

SUMMARY OF THE INVENTION

With the above in mind, embodiments of the present invention are directed to a modular street lighting system comprising an attachment structure configured to attach to a street lamp pole, power circuitry positioned within the attachment structure and positioned in electrical communication with a power supply, a support structure extending outwardly from the attachment structure, and a lighting component that may be configured to be attached to the support structure. The attachment structure may be configured to permit a plurality of support structures to be attached thereto. Additionally, the support structure may be configured to permit a plurality of lighting components to be attached thereto. The lighting component may be positioned in electrical communication with the power circuitry.

In some embodiments, the lighting component may comprise an electrical housing, a body member, a lighting element, and an optic. The electrical housing may be attached to the body member towards a distal end of the body member. Furthermore, the lighting element may be attached to the body member towards a proximal end of the body member. Additionally, the electrical housing may be configured to attach to the support structure.

In some embodiments, the body member may comprise a plurality of heat dissipating structures. The plurality of heat dissipating structures may be interior walls connected to exterior walls of the body member that are oriented vertically. Furthermore, the lighting element may be attached to a proximal surface of a proximal end wall of the body member, the proximal end wall having a thickness of approximately 0.125 inches, with thicknesses within the range from 0.0625 inches to 0.5 inches are contemplated and included within the scope of the invention. The plurality of heat dissipating structures are configured to permit fluidic flow across a distal surface of the proximal end wall of the body member.

In some embodiments, the optic may comprise a primary optic and a secondary optic. The primary optic may be configured to at least one of reflect and refract light in a direction generally orthogonal to a normal of a surface of the lighting element. In some embodiments, at least a portion of the optic may comprise a color conversion material.

The modular street lighting system may further comprise a pair of extension members and an outer member attached to each of the pair of extension members. The lighting component may be attached to the outer member. The modular street lighting system may further comprise a plurality of pairs of extension members and a plurality of lighting components. An outer member may be attached to each of the pair of extension members, and a lighting component may be attached to each outer member.

In some embodiments, the support structure may comprise a plurality of support arms extending from the attachment structure and a lighting attachment structure attached to the plurality of support arms. The lighting attachment structure may be configured to permit a lighting component to be attached thereto. Furthermore, the attachment section may be configured to permit a plurality of lighting devices attach thereto and configured to permit at least one of the plurality of lighting devices attached thereto be attached so as to emit light in a direction that is different from a direction of light emitted by another lighting device of the plurality of lighting devices attached thereto. The attachment section may be annular.

A further embodiment of the invention is directed to a lighting component for a street lighting system, the lighting component comprising a body member comprising a light source housing section and a center component, the center component comprising a plurality of vertically-oriented heat dissipating structures, a circuit housing attached to the body member, circuitry positioned within the circuit housing, a rear attachment section, a lighting element attached to and positioned in thermal communication with a back wall of the light source housing section and positioned in electrical communication with the circuitry, and an optic positioned within the light source housing section. The circuitry may be configured to provide power for and control the operation of the lighting element. Additionally, the lighting element may be configured to emit light in the direction of the optic. The optic may be configured to reflect light so as to be emitted by the lighting component. Furthermore, the plurality of heat dissipating structures are positioned in thermal communication with the back wall.

In some embodiments, the optic may be a primary optic, and the lighting component may further comprise a secondary optic. The primary optic may be configured to reflect light emitted by the lighting element in the direction of the secondary optic. Furthermore, the plurality of heat dissipating elements may be exposed to the environment surrounding the lighting component.

DETAILED DESCRIPTION OF THE INVENTION

Figure 1:
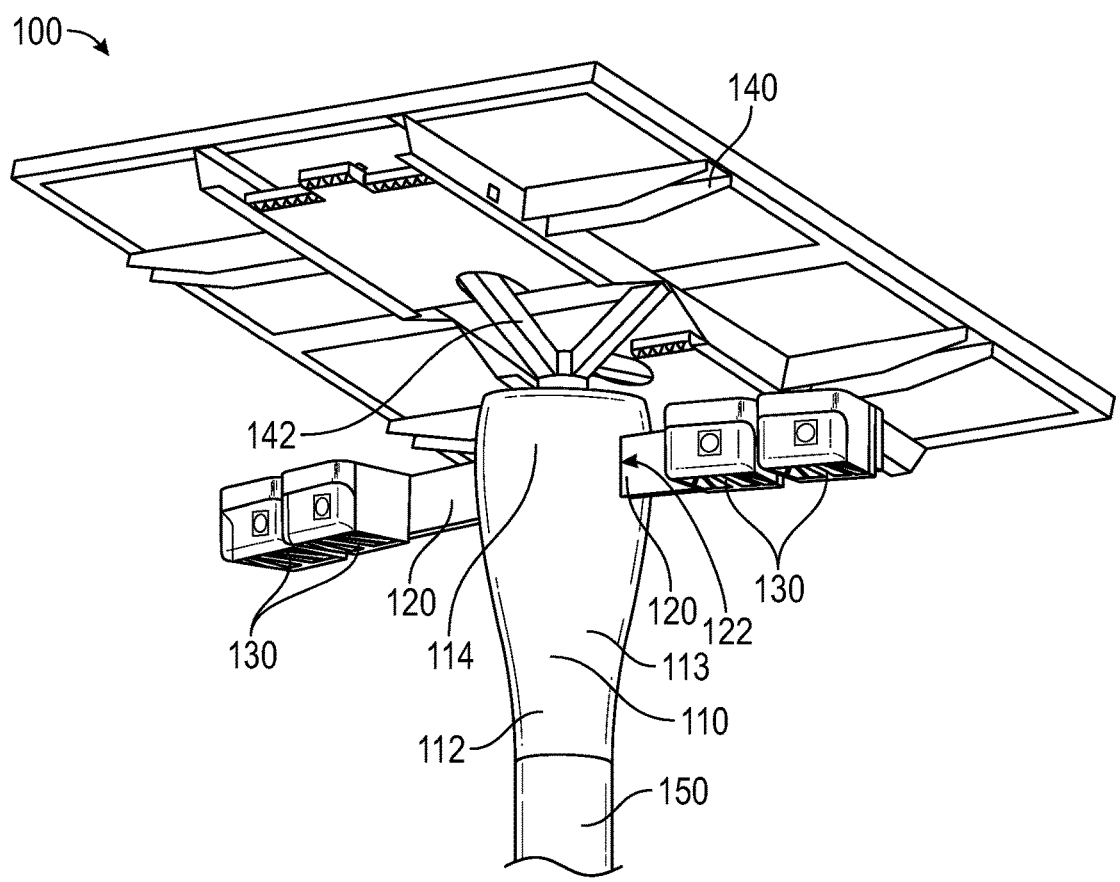
FIG. 1 is a perspective view of a street lighting system according to an embodiment of the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a modular street lighting system that may be installed with various numbers of lighting components in a variety of positions and orientations. The flexibility in installation may reduce the need for manufacturing lighting components tailored to meet the needs of specific lighting tasks, allowing for a single type of lighting component to be installed to accomplish a wide variety of lighting tasks. Moreover, some embodiments of the invention will enable the street lighting system to be installed on existing infrastructure, such as existing street light poles and utilizing existing electrical power sources. Furthermore, some embodiments of the invention will provide scalable photovoltaic devices to facilitate powering of the street lighting system, as well as any peripheral electronic devices associated therewith.

Referring now to FIG. 1, a modular street lighting system 100 according to an embodiment of the invention is presented. The modular street lighting system 100 may comprise an attachment structure 110, one or more support structures 120, and one or more lighting components 130. Furthermore, in some embodiments, the modular street lighting system 100 may further comprise a power generating component 140.

The attachment structure 110 may be configured to be attachable to a street lamp pole 150. The attachment structure 110 may be configured to facilitate any means or method of attachment to the street lamp pole 150 as is known in the art, including, but not limited to, fasteners, welding, interference fits, adhesives, tab and slot, and the like, and any combinations thereof. Furthermore, the attachment of the attachment structure 110 to the street lamp pole 150 may be weather-resistant, thereby prolonging the attachment therebetween as well as providing shelter from environmental factors surrounding the modular street lighting system 100 to elements of the modular street lighting system 100 positioned within the attachment structure 110, as will be discussed in greater detail hereinbelow. Additionally, the attachment between the attachment structure 110 and the street lamp pole 150 may be such that enables the connection between electrical elements of the modular street lighting system 100 and electrical elements associated with the street lamp pole 150.

The attachment structure 110 may have any geometry as is desired. In the present embodiment, a lower section 112 of the attachment structure 100 may be generally circular, having a diameter that facilitates attachment to the street lamp pole 150. The lower section 112 may be configured to have any shape that may facilitate attachment to the street lamp pole 150. In some embodiments, the lower section 112 may have a generally rectangular or square shape, so as to facilitate attachment to a similarly-shaped street lamp pole 150.

Furthermore, the attachment structure 110 may have an upper section 114. The upper section 114 may have a geometry that is similar to the lower section 112, or that may differ from the lower section 112 in a variety of characteristics, including shape, size, wall thickness, and the like. In the present embodiment, the upper section 114 may be generally circular and have a diameter that is generally greater than the diameter of the lower section 112. In some embodiments, an upper section 114 having a greater diameter or width, which may reduce the required length for the support structures 120.

Furthermore, the attachment structure 110 may include a transition section 113 intermediate the lower section 112 and the upper section 114 wherein the transition between the differing geometries of the lower section 112 and the upper section 114 may occur.

Additionally, the attachment structure 110 may be configured to facilitate the attachment of the support structures 120 thereto. Moreover, the attachment between the attachment structure 110 and the support structures 120 may enable the attachment structure 110 to carry the support structures 120. In the present embodiment, the support structure 120 may be attached to the attachment structure 110 at an end 122 of the support structure 120. Any means or methods as is known in the art may be used to attach the support structures 120 to the attachment structure 110, which are recited hereinabove. Furthermore, the attachment between the attachment structure 110 and the support structures 120 may enable the connection between electrical components associated with the attachment structure 110 and electrical components associated with each support structure 120. In some embodiments, the attachment structure 110 and the support structures 120 may be formed as an integral component.

The support structures 120 may be configured to facilitate the attachment of the lighting components 130 thereto. Moreover, the attachment between a support structure 120 and a lighting component 130 may enable the lighting component 130 to be carried by the support structure 120. Any means or method as is recited hereinabove, and those otherwise known in the art, may be employed in attaching a lighting component 130 to a support structure 120. Furthermore, the attachment between the lighting component 130 and the support structure 120 may enable the electrical connection between electrical elements associated with the lighting component 130 with those associated with the support structure 120. Furthermore, in some embodiments, the electrical connection between electrical elements of the support structure 120 and the attachment structure 110 may enable electrical communication between the electrical elements of the attachment structure 110 and the lighting component 130. Such electrical connection may enable the control of operation of electrical elements of the lighting component 130 by electrical elements of the attachment structure 110.

The support structures 120 may be configured to facilitate the disposition of lighting components 130 at locations and in orientations so as to emit light as desired. Accordingly, the support structures 120 may be configured to have a length that may facilitate the attachment of one or more lighting components 130 along the length, enabling the emission of light by the lighting components 130 that achieves a light distribution of the modular street lighting system 100 as desired. The length of the support structures 120 may be a function of the desired light distribution of the modular street lighting system 100 and the diameter/width of the attachment structure 110, as discussed hereinabove. In general, the support structure 120 will be subjected to reduced load forces to the extent the length can be reduced, while still reducing the amount of material used in the modular street lighting system 100.

In the present embodiment, the support structures 120 have a generally straight, linear configuration. In some embodiments, the support structures 120 may have a different geometry, including, curved, twisted, bent, form a polygonal shape, or any other configuration.

The modular street lighting system 100 according to embodiments of the present invention may further comprise control circuitry (not shown). The control circuitry may be operably connected to the lighting components 130 of the modular street lighting system 100 so as to control the operation thereof. In some embodiments, the control circuitry may be positioned within the attachment structure 110. Accordingly, through electrical connections between the control circuitry, electrical connectors in the support structures 120, and electrical elements of the lighting components 130, the control circuitry may control the operation of the lighting components 130.

In some embodiments, the modular street lighting system 100 may further comprise power circuitry (not shown). The power circuitry may be configured to electrically connect to an electrical power supply associated with the street lamp pole 150. Such an electrical power supply may be a power grid. The power circuitry may be configured to receive electrical power from the electrical power supply and convert, condition, and otherwise alter the electrical power received from the electrical power supply for use by the various electrical elements of the modular street lighting system 100. For example, the power circuitry may be configured to convert AC power to DC power. In some embodiments, the power circuitry may be comprised by the control circuitry.

The power generating component 140 may be any device capable of generating electrical power as is known in the art. Such devices include, but are not limited to, photovoltaic (PV) devices, wind turbines, and the like. In the present embodiment, the power generating component 140 comprises a PV device. The power generating component 140 may be electrically connected to at least one other electrical element of the modular street lighting system 100 such that electrical power generated thereby may be used in the operation of the modular street lighting system 100. More specifically, the power generating component 140 may be electrically connected to at least one of the control circuitry and the power circuitry. In some embodiments, the power circuitry may be configured to tie the power generating component 140 to a power grid, such that electrical power generated by the power generating component 140, either wholly or in part, may be fed into the power grid via the power circuitry. In some embodiments, the power generating component 140 may comprise on-board circuitry configured to control the operation of the power generating component 140, as well as possibly conditioning electrical power generated thereby for use by one or more electrical components of the modular street lighting system 100.

The power generating component 140 may be attached to any part of the modular street lighting system 100 that may carry it. In the present embodiment, the power generating component 140 is attached to an upper end of the attachment structure 110 by a power generating component (PGC) attachment member 142. The PGC attachment member 142 is configured to attach to each of the power generating component 140 and the attachment structure 110 such that the power generating component 140 is fixedly, removably attached to the attachment structure 110 by any means or methods recited hereinabove or as is otherwise known in the art. Furthermore, the PGC attachment member 142 may be configured to orient the power generating component 140 so as to maximize the amount of electrical power generated thereby. In the present embodiment, the PGC attachment member 142 may be configured to tilt the power generating component 140 responsive to at least one of the longitude and the latitude of the street lamp pole 150. In some embodiments, the PGC attachment member 142 may be configured to actively reposition the orientation of the power generating component 140 so as to maximize electrical power generated thereby, including periodic repositioning due to changes of angle of inclination of the Earth and tracking the position of the sun in the sky during a one-day period. Such repositioning may be automatic and controlled by an electrical component associated with at least one of the power generating component 140 or the modular street lighting system 100 generally.

Figure 2:
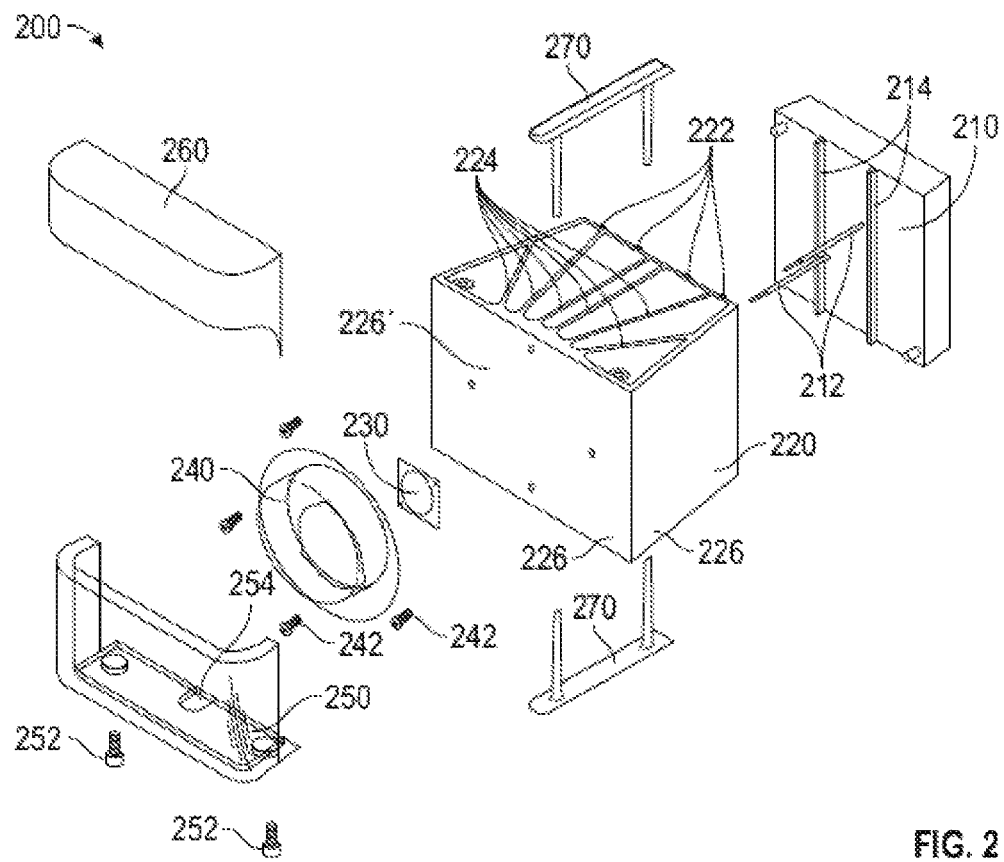
FIG. 2 is an exploded perspective view of a lighting component of the street lighting system illustrated in FIG. 1.
Figure 3:
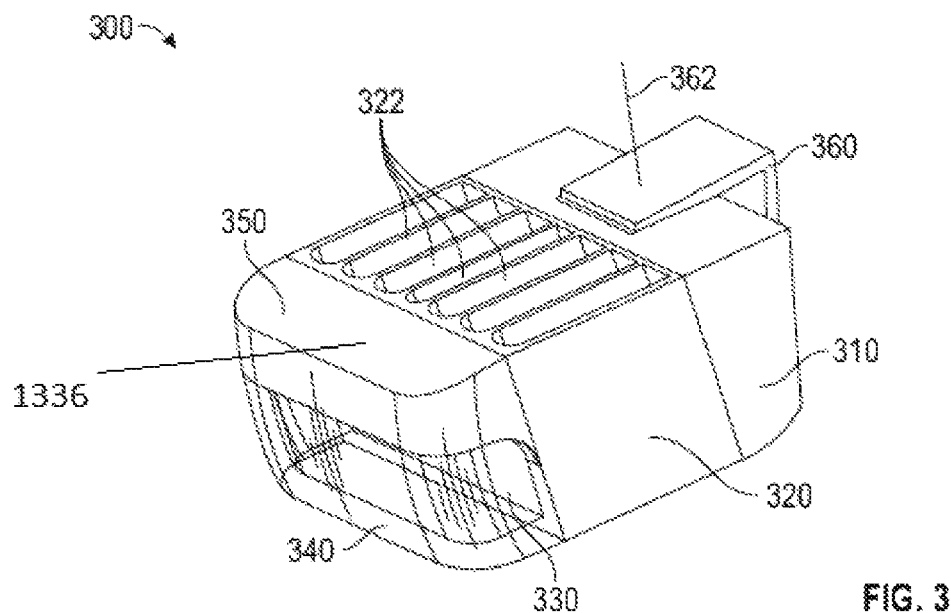
FIG. 3 is a perspective view of a lighting component according to an embodiment of the invention.

Referring now to FIGS. 2-3, more details about a lighting component 200 according to an embodiment of the invention will be discussed. The lighting component 200 may comprise an electrical housing 210, a body member 220, a lighting element 230, a primary optic 240, and a secondary optic 250. As described above, the lighting component 200 may be configured to attach to a support structure 120 to be carried thereby and to electrically connect to electrical elements of the support structure 120 so as to receive electrical power delivered thereby from at least one of control circuitry and power circuitry associated with the modular street lighting system 100.

The lighting component 200 may comprise circuitry positioned within the electrical housing 210 configured to facilitate the operation of electrical elements of the lighting component 200, including the lighting element 230. For example, the electrical housing 210 may comprise apertures enabling the positioning of electrical connectors 212 therewithin, enabling the electrical connection between circuitry positioned within the electrical housing 210 and other electrical components of the lighting component 130, such as the lighting element 230. The electrical housing 210 may further be configured to facilitate the attachment of the lighting component 200 to a support structure 120. In some embodiments, the lighting component 200 may comprise circuitry configured to receive electrical power from an external power source, such as a power grid or a power generating component 140 and convert and condition the electrical power for use by electrical components of the lighting component 200, obviating the need for such circuitry in other parts of the modular street lighting system 100, such as the power circuitry. Furthermore, in some embodiments, the lighting component 200 may comprise circuitry configured to operate the electrical components of the lighting component 200, obviating the need for such circuitry in other parts of the modular street lighting system 100, such as the control circuitry.

Furthermore, the electrical housing 210 may be configured to attach to the body member 220. Specifically, the electrical housing 210 may be attached toward a distal end of the body member 220. The attachment between the body member 220 and the electrical housing 210 may enable the body member 220 to be carried thereby. Any means or method of forming this attachment as recited above or as may otherwise be known in the art may be employed.

Furthermore, each of the electrical housing 210 and the body member 220 may be configured to minimize the transfer of thermal energy therebetween. This may be desirous so as to thermally isolate other electrical components of the lighting component 200, such as the lighting element 230, from thermal energy generated by the electrical components of the electrical housing 210. In the present embodiment, each of the electrical housing 210 and the body member 220 may comprise a plurality of outcroppings 214, 222, respectively, configured to position the body member 220 at a distance from the electrical housing 210. Any other means, method, or structure that may increase the thermal isolation therebetween, including use of thermally isolating material, are contemplated and included within the scope of the invention.

In some embodiments, the body member 220 may be configured to facilitate dissipation of thermal energy generated by the lighting component 200, such as heat generated by the lighting element 230. In such embodiments, the body member 220 may include structural features configured to increase its thermal dissipation capacity. In the present embodiment, the body member 220 comprises a plurality of heat dissipating structures 224. The plurality of heat dissipating structures 224 may be configured to increase the surface area of the body member 220, thereby enabling greater dissipation of heat into the environment. Furthermore, the plurality of heat dissipating structures 224 may cooperate to form channels that are open to the environment and through which air from the environment may circulate, enabling greater convection and dissipation of heat thereby. Additionally, each of the plurality of heat dissipating structures 224 may have a variety of geometric configurations. In the present embodiment, the plurality of heat dissipating structures 224 are interior walls connected at two ends to exterior walls 226, namely, proximal and distal end walls, of the body member 220. In this way, the plurality of heat dissipating structures 224 may contribute to the structural integrity of the body member 220 while also increasing the thermal dissipation capacity thereof. In the present embodiment, the plurality of heat dissipating structures 224 may be integrally formed with the exterior walls 226. Any type of structure for the plurality of heat dissipation structures 224 is contemplated and included within the scope of the invention. Furthermore, the surface of the plurality of heat dissipation structures 224 may comprise features, such as dimples, grooves, outcroppings, recesses, and the like, to facilitate thermal dissipation.

Additionally, either or both of the plurality of heat dissipating structures 224 and the external walls 226, as well as any other element of the body member 220, may be formed of thermally conductive material, such as thermally conductive metals and metal alloys, ceramics, polymers, and the like. In some embodiments, the outcroppings 222 of the body member 220 may be formed of a material having lower thermal conductivity relative to the other elements of the body member 220 so as to facilitate the thermal isolation of the body member 220 from the electrical housing 210.

Additionally, the body member 220 may be configured to facilitate the attachment of the lighting element 230 thereto so as to be carried thereby. Specifically, a proximal end wall 226' may facilitate the attachment of the lighting element 320 thereto. Furthermore, the proximal end wall 226' may be configured to conduct heat away from the lighting element 320 to other heat dissipating structures of the plurality of heat dissipating structures 224. For example, the proximal end wall 226' may be configured to have a thickness of approximately 0.125 inches, with thicknesses within the range from 0.0625 inches to 0.5 inches are contemplated and included within the scope of the invention. All means and methods of attachment recited hereinabove or otherwise known in the art are contemplated and included within the scope of the invention. Furthermore, the attachment between the body member 220 and the lighting element 230 may be configured to facilitate the transfer of heat from the lighting element 230 to the body member 220. This may enable the lighting element 230 to maintain a lower operating temperature. Accordingly, the use of thermal grease or other thermally conductive media between the lighting element 230 and the body member 220 is contemplated.

The lighting element 230 may be a light-emitting device as is known in the art, including, but not limited to, light-emitting semiconductors, such as light-emitting diodes (LEDs), incandescents, gas-discharge lamps, arc lamps, and the like. In the present embodiment, the lighting element 230 may comprise a plurality of LEDs.

The lighting element 230 may be configured to emit light having varying characteristics, including, but not limited to, brightness, color, color temperature, color rendering index, luminosity, and the like. Moreover, the lighting element 230 may be configured to emit light having a desired spectral power distribution. Furthermore, the lighting element 230 may be configured to emit light configured to cause or avoid biological affects in humans and fauna that may perceive light emitted thereby. Additional information regarding the characteristics of light emitted by the lighting device 230 may be found in U.S. patent application Ser. No. 14/315,660 titled Tunable LED Lamp for Producing Biologically-Adjusted Light and Associated Methods filed Jun. 26, 2014, U.S. patent application Ser. No. 14/271,540 titled Sustainable Outdoor Lighting System for Use in Environmentally Photo-Sensitive Area filed May 7, 2014, and U.S. Pat. No. 8,475,002, the contents of each of which are incorporated by reference herein in their entireties except to the extent disclosures therein are inconsistent with disclosures herein.

Additionally, the lighting element 230 may be configured to have a desired distribution of light emitted thereby. In the present embodiment, the lighting element 230 may emit light generally away from the body member 220. More specifically, the lighting element 230 may emit light away from the body member 220 in a generally hemi-spherical distribution relative to the surface of the body member 220 to which the lighting element 230 is attached. In other embodiments, the lighting element 230 may emit light so as to have a particular distribution upon emission of the light by the modular street lighting system 100. More particularly, the lighting element 230 may emit light in a direction such that the emitted light is effected by an optical member of the modular street lighting system 100. In other embodiments, the lighting element 230 may emit light that is generally unchanged by other optical members of the modular street lighting system 100. Additionally, the lighting element 230 may be positioned and configured to emit light to have a desired distribution relative to the environment and/or features or structures in the environment. In the present embodiment, the lighting element 230 may be configured and positioned to emit light that is generally parallel to the ground. In other embodiments, the lighting element 230 may be positioned and configured to emit light that is generally in the direction of the ground, generally away from the ground, generally perpendicular to the ground, generally away from a wall or structure, generally in the direction of a wall, structure, or feature thereof, and the like.

The primary optic 240 may be positioned such that light emitted by the lighting element 230 is incident thereupon and passes therethrough. Accordingly, the primary optic 240 may be configured to be attached to an element of the lighting component 200 so as to be carried thereby in a position to be in optical communication with the lighting element 230. In the present embodiment, the primary optic 240 may be configured to be attached to the body member 220 by use of a plurality of fasteners 242. All means and methods of attachment as recited hereinabove and otherwise known in the art are contemplated and included within the scope of the invention.

The primary optic 240 may be configured to alter characteristics of light passing therethrough. For example, the primary optic 240 may be configured to reflect, refract, redirect, or otherwise alter the direction of travel of lighting incident thereupon and passing therethrough. Moreover, the primary optic 240 may be configured to alter the direction of travel of light differently at differing positions on the primary optic 240. Furthermore, the primary optic 240 may be configured to redirect light so as to result in the emission of light therefrom, or, in some embodiments, from the modular street lighting system 100, in a desired distribution. The primary optic 240 may be configured to redirect light so as to have an asymmetric distribution. In the present embodiment, the primary optic 240 may be configured to result in a distribution primarily in a direction towards the ground, in a direction generally normal to at least one of a surface of the lighting element 230 and the surface of the body member 220 to which the lighting element 230 is attached, and generally perpendicular to the described normal, as well as directions therebetween. Furthermore, the primary optic 240 may be configured to redirect light away from a direction generally toward the sky. Additionally, the primary optic 240 may be configured to redirect light in a greater proportion in the direction generally toward the ground relative to the normal direction and the direction perpendicular to normal.

Additionally, in some embodiments, the primary optic 240 may be configured to alter the spectral power distribution of light incident thereupon and passing therethrough. In some embodiments, the primary optic 240 may comprise at least one of a filter and a color conversion layer configured to at least one of reduce intensity of light within a first wavelength range and increase intensity of light within a second wavelength range. Additional information regarding the color conversion layer may be found in U.S. Pat. No. 8,408,725 titled Remote Light Wavelength Conversion Device and Associated Methods filed Sep. 16, 2011 and U.S. Pat. No. 8,545,034 titled Dual Characteristic Color Conversion Enclosure and Associated Methods filed Jun. 24, 2013, the contents of each of which are incorporated by reference in their entireties except to the extent disclosures therein are inconsistent with disclosures herein. The primary optic 240 may comprise multiple filters and/or color conversion layer, such that light emitted thereby does not have uniform characteristics.

The secondary optic 250 may be configured to be positioned such that the primary optic 240 is intermediate optically the secondary optic 250 and the lighting element 230. Additionally, the secondary optic 250 may be configured to be attached to an element of the lighting component 200 so as to be carried thereby. In the present embodiment, the secondary optic 250 may be configured to be attached to and carried by the body member 220. Any means or method of attachment as described hereinabove or as otherwise known in the art may be employed in attaching the secondary optic 250. In the present embodiment, a plurality of screws 252 may be used to attach the secondary optic 250 to the body member 210, which may be configured to receive the plurality of screws 252.

The secondary optic 250 may be configured to shield elements of the lighting component 200 from elemental factors, such as dirt, particulate matter, precipitation, excessive cold, and the like, while permitting light to pass therethrough. In the present embodiment, each of the primary optic 240 and the lighting element 230 may be shielded from elemental factors in part by the secondary optic 250. The secondary optic 250 may be configured to provide shielding to the desirously shielded elements of the lighting component 230 where it is similarly desirable for light to be emitted therefrom. In the present embodiment, the secondary optic 250 may be configured to provide shielding in a direction, relative to at least one of the primary optic 240 and the lighting element 230, of the ground, generally normal to at least one of the lighting element 230 and the surface of the body member 220 to which the lighting element 230 is attached, and generally perpendicular to the normal, as well as other directions therebetween.

In some embodiments, the secondary optic 250 may be configured to cooperate with the primary optic 240 in the redirection of light emitted by the lighting element 230 so as to be emitted from the modular street lighting system 100 in a desired distribution. Furthermore, the secondary optic 250 may comprise one or more filters and/or color conversion materials configured to alter the spectral power distribution of light as described hereinabove. Additionally, in some embodiments, the secondary optic 250 may be configured to impact light passing therethrough as minimally as possible.

Each of the primary optic 240 and the secondary optic 250 may be formed of optically transparent or translucent material. Such materials include, but are not limited to, glasses and polymers. Furthermore, they may be formed of the same material, or they may be wholly or at least partially formed of differing materials. Additionally, in some embodiments, either or both of the primary optic 240 and the secondary optic 250 may be formed of antiballistic materials configured to withstand kinetic energy ballistic objects or explosive objects.

In some embodiments, the lighting component 200 may further comprise a shield member 260. The shield member 260 may cooperate with the secondary optic 250 so as to shield element of the lighting component 200 from environmental factors. In some embodiments, the shield member 260 may be configured to at least partially conform to the geometry of the secondary optic 250 such that the shield member 260 may interface with and, in some embodiments, be attached to the secondary optic 250 so as to form a barrier to environmental factors.

Additionally, the shield member 260 may be configured and positionable so as to occlude light from passing therethrough. This may be desirable so as to prevent light from being emitted in a certain direction. Accordingly, the shield member 260 may be formed of any opaque material, including opaque polymers. In the present embodiment, the shield member 260 may be positioned so as to at least partially occlude light emitted by the lighting element 230 in a direction generally toward the sky.

In some embodiments, the lighting component 200 may comprise one or more attachment members 270. The attachment members 270 may be configured to facilitate the attachment of one or more elements of the lighting component 200 to another element thereof. In the present embodiment, two attachment members 270 may be configured to attach to and be carried by the body member 220, and at least one may be configured to cooperate with a recess 254 of the secondary optic 250 to facilitate the attachment thereof to the body member 220 as well as to mitigate relative movement thereof.

Referring now to FIG. 3, a lighting component 300 according to another embodiment of the invention is presented. The lighting component 300 of FIG. 3 is similar to the lighting component 200 of FIG. 2, comprising an electrical housing 310, a body member 320, a light source housing section 1336 comprising a lighting element (not pictured), a primary optic 330, a secondary optic 340, and a shield member 350. In the present embodiment, the body member 320 comprises a plurality of heat dissipating structures 322 configured as a plurality of generally parallel walls.

Additionally, the lighting component 300 further comprises a support attachment member 360. The support attachment member 360 may be configured to facilitate the attachment of the lighting component 300 to a support structure 120. The support attachment member 360 may be configured to attach to another element of the lighting component 300 so as to carry the other element, and the other elements of the lighting component 300, thereby. In the present embodiment, the support attachment member 360 may attach to the electrical housing 310. Any means or method of attachment described hereinabove or otherwise known in the art may be employed in the attachment. Similarly, any means or method of attachment described hereinabove or otherwise known in the art may be employed in attaching the support attachment member 360 to the support structure 120, such that the attachment enables the support attachment member 360, and the lighting component 300 by extension, to be carried by the support structure 120.

In some embodiments, the support attachment member 360 may be configured to permit the lighting component 300 to be positioned at various orientations relative to the support structure 120. For example, the support attachment member 360 may be attached to the electrical housing 310 so as to enable the lighting component 300 to be rotated about axis 362.

Figure 4:
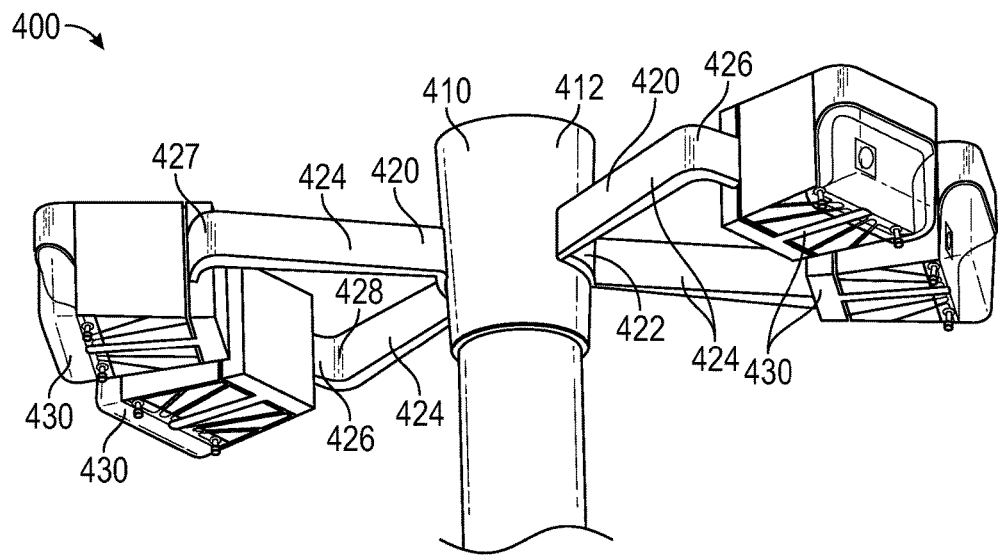
FIG. 4 is a perspective view of a street lighting system according to an embodiment of the invention.

Referring now to FIG. 4, an alternative embodiment of the invention is presented. In the present embodiment, a modular street lighting system 400 comprises an attachment structure 410, a plurality of support structures 420, and a plurality of lighting components 430. The various electrical aspects of the modular street lighting system 400 may be similar to those of the modular street lighting system 100 of FIG. 1.

In the present embodiment, the support structures 420 may have an alternative configuration to that of the support structures 120 of FIG. 1. More specifically, the support structures 420 may comprise an attachment section 422, one or more extension sections 424, and an outer section 426. The attachment section 422 may be configured to be attached to the attachment structure 410 by any means or method recited herein or is otherwise known in the art, so as to be carried thereby. In some embodiments, the support structure 420 may be integrally formed with the attachment structure 410. The attachment section 422 may have a geometry that complies with or conforms to the geometry of the attachment structure 410 such that the attachment section 422 may interface with an outer surface 412 of the attachment structure 410, facilitating attachment therebetween.

The extension members 424 may extend generally outwardly from the attachment section 422 so as to extend generally away from the attachment structure 410. Any length of extension members 424 is contemplated and included within the scope of the invention, as well as any number of extension members 424. The extension members 424 may be attached to or integrally formed with the attachment section 422.

The outer section 426 may be configured to be attached to, or integrally formed with, with the extension members 424, so as to be carried thereby. In the present embodiment, a pair of extension members 424 may connect to the outer section 426 to opposite ends 427, 428 of the outer section 426. Other positions of connection are contemplated and included within the scope of the invention. Furthermore, the outer section 426 may be configured to facilitate the attachment of the lighting components 430 thereto. Any means or method of attachment as recited hereinabove or otherwise known in the art are contemplated and included within the scope of the invention. In some embodiments, the outer section 426 may be integrally formed with an element of the lighting component 430, such as the electrical housing 210 as depicted in FIG. 2.

The use of a pair of extension members 424 may provide increased structural integrity and resistance to failure due to external forces relative to the support structures 120 of FIG. 1, and may also facilitate the positioning of lighting components 430 at a greater distance from the attachment structure 410 and in alternative orientations relative to the attachment structure 410.

In the present embodiment, the modular street lighting system 400 comprises two support structures 420, each support structure 420 configured to permit two lighting components 430 to be attached thereto. Any number of support structures 420 configured to permit attachment of any number of lighting components 430 is contemplated and included within the scope of the invention. Furthermore, the support structures 420 of the present embodiment are positioned generally opposite each other. Any alternative positioning of support structures 420 of any number is contemplated and included within the scope of the invention.

Figure 5:
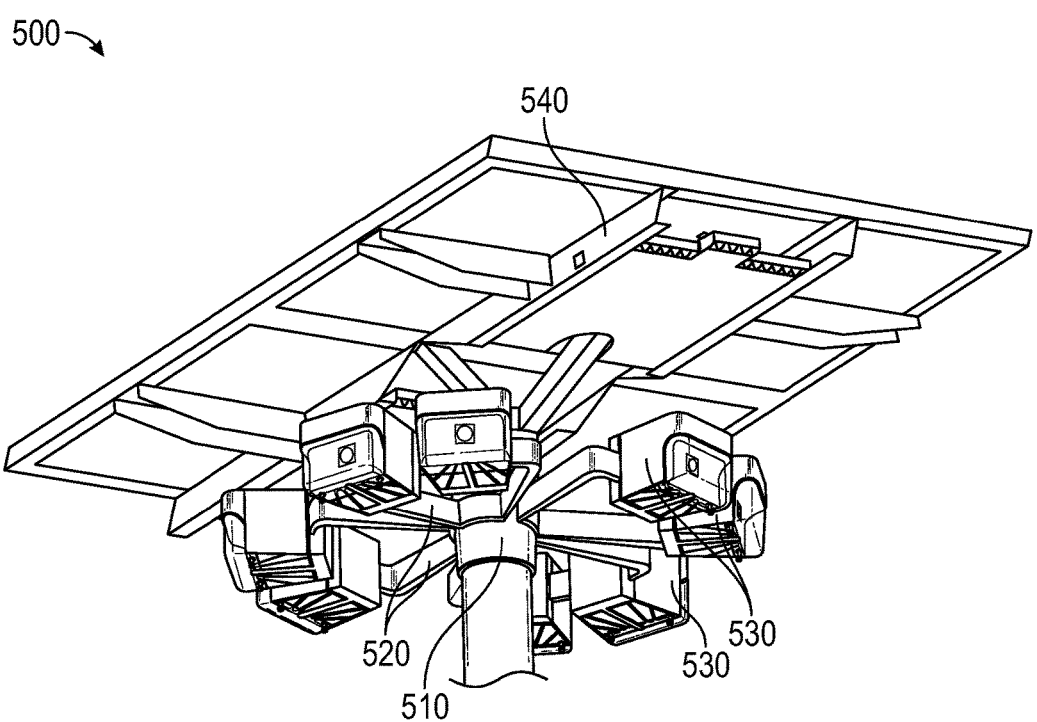
FIG. 5 is a perspective view of a street lighting system according to an embodiment of the invention.

Referring now to FIG. 5, an alternative embodiment of the invention is presented. A modular street lighting system 500 comprises an attachment structure 510, a plurality of support structures 520, and a plurality of lighting components 530 each attached to and carried by a support structure 520. In the present embodiment, the modular street lighting system 500 comprises four support structures 520 configured similarly to the support structures 420 depicted in FIG. 4. Additionally, the support structures 520 are spaced approximately regularly so as to form opposite pairs. Additionally, the modular street lighting system 500 comprises eight lighting components 530.

Additionally, the modular street lighting system 500 may comprise a power generating component 540. The power generating component 540 may be any type of power generating device as described hereinabove or as otherwise known in the art. In the present embodiment, the power generating component 540 may be a photovoltaic device. Furthermore, the power generation capacity of the power generation component may be proportional to the electrical demands of the modular street lighting system 500. In comparison to the embodiment of the modular street lighting system 100 of FIG. 1, which comprises four lighting components 130, the present embodiment of the modular street lighting system 500 comprises eight lighting components 530. Depending on the power demands of each respective lighting component 530, the electrical demands of the modular street lighting system 500 of the present embodiment may be greater than that of the modular street lighting system 100 of FIG. 1. Accordingly, the power generating component 540 may be configured to have a greater power generation capacity than the power generating component 140 of FIG. 1.

Figure 6:
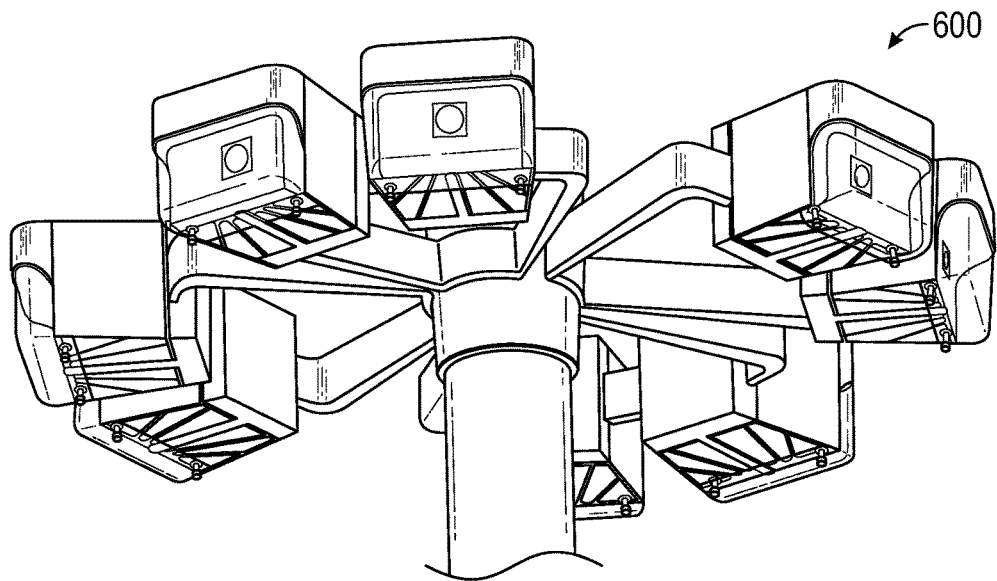
FIG. 6 is a perspective view of a street lighting system according to an embodiment of the invention.

Referring now to FIG. 6, an embodiment of the invention is presented. The modular street lighting system 600 is essentially the same as that depicted in FIG. 5, with the exclusion of the power generating component 540.

Figure 7:
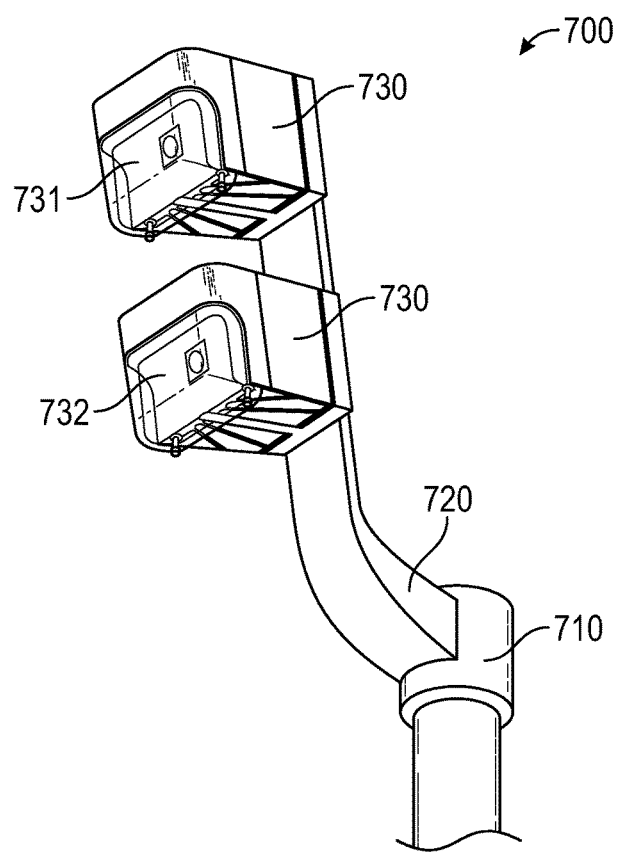
FIG. 7 is a perspective view of a street lighting system according to an embodiment of the invention.

Referring now to FIG. 7, an alternative embodiment of the present invention is presented. A modular street lighting system 700 may comprise an attachment structure 710, a support structure 720, and one or more lighting components 730. In the present embodiment, a single support structure 720 may be attached to the attachment structure 710 and extend outwardly and upwardly therefrom. Furthermore, the modular street lighting system 700 may comprise two lighting components 730 attached to the support structure 720 such that a first lighting component 731 is positioned generally above a second lighting component 732. In the present embodiment, the first and second lighting components 731, 732, are positioned having approximately the same angular orientation. In some embodiments, the first and second lighting components 731, 732 may be positioned to have differing orientations. Such differing orientations between lighting components 730 may be applied to all embodiments of the invention.

Figure 8:
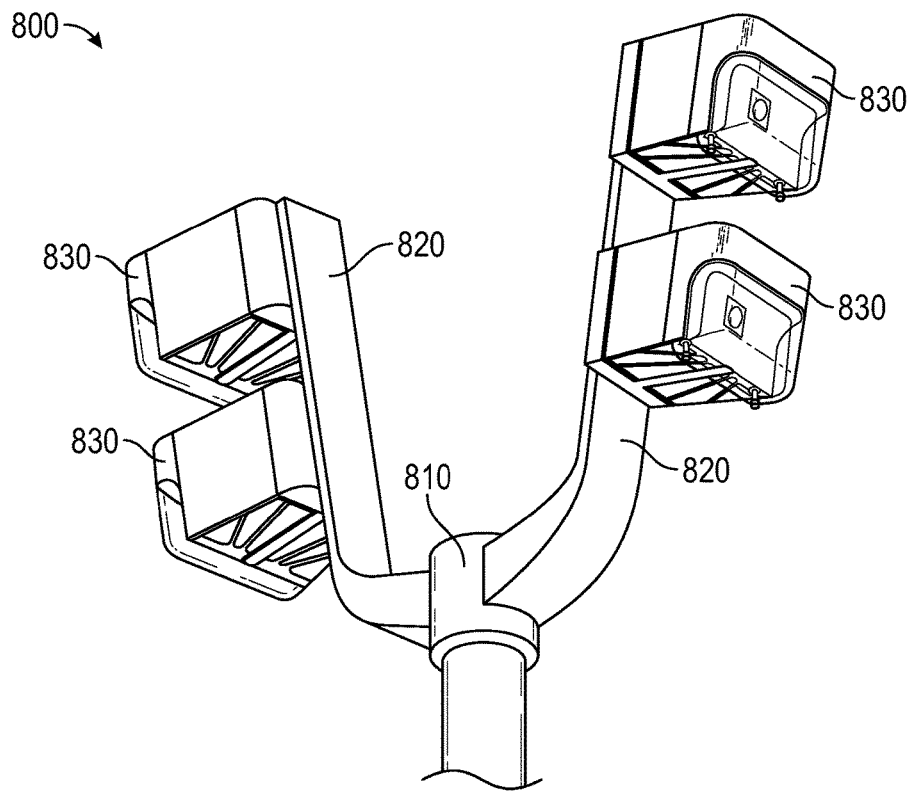
FIG. 8 is a perspective view of a street lighting system according to an embodiment of the invention.

Referring now to FIG. 8, an alternative embodiment of the invention is presented. In the present embodiment, a modular street lighting system 800 may comprise an attachment structure 810, two opposing support structures 820, and one or more lighting components 830. The support structures 820 may be similar to the support structure 720 depicted in FIG. 7. Furthermore, while the support structures 820 are positioned generally opposite each other, it is contemplated and included within the scope of the invention that the support structures 820 may be positioned in any position relative to each other. Furthermore, it is contemplated and included within the scope of the invention that the modular street lighting system 800 may comprise any number of support structures 820 in any position relative to one another. Furthermore, it is contemplated and included within the scope of the invention that the support structures 820 may have unequal numbers of lighting components 830 attached thereto.

Figure 9:
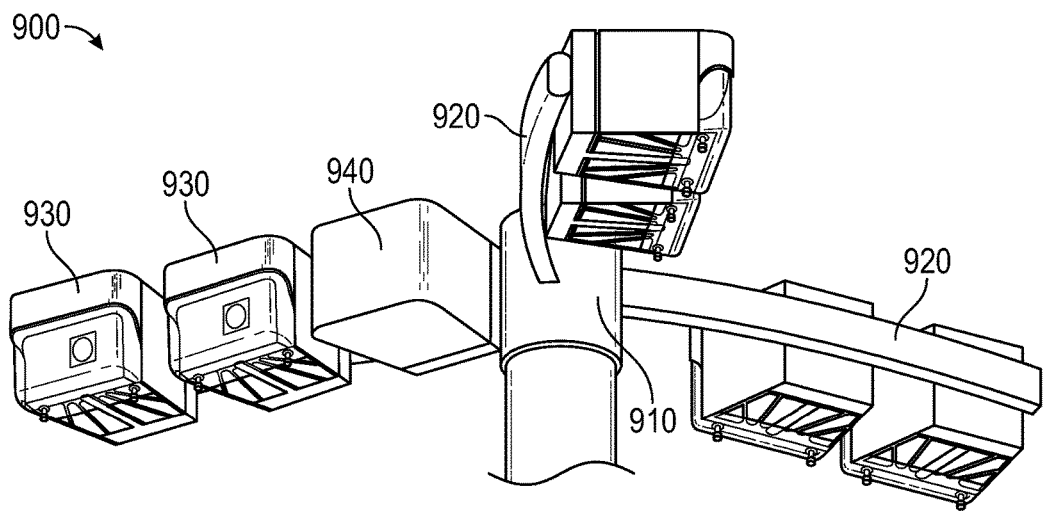
FIG. 9 is a perspective view of a street lighting system according to an embodiment of the invention.

Referring now to FIG. 9, an alternative embodiment of the invention is presented. A modular street lighting system 900 comprises an attachment structure 910, a plurality of support structures 920, a plurality of lighting components 930, and an electrical component housing 940. The support structures 920 may be configured to attach to and extend outwardly from the attachment structure 910. In some embodiments, the support structures 920 may have a curvature.

The electrical component housing 940 may be configured to permit positioning therewithin of electrical elements associated with the modular street lighting system 900. For example, the electrical component housing 940 may be configured to permit electrical elements such as the control circuitry and power circuitry of the modular street lighting system 100 of FIG. 1 therewithin. Furthermore, the electrical component housing 940 may be configured to be attached to and be carried by a support structure 920. Any attachment means or method described hereinabove or otherwise known in the art may be employed. Furthermore, the attachment may enable the electrical connection between electrical elements within the electrical component housing 940 and other electrical elements of the modular street lighting system 900, such as electrical elements of the lighting components 930.

Figure 10:
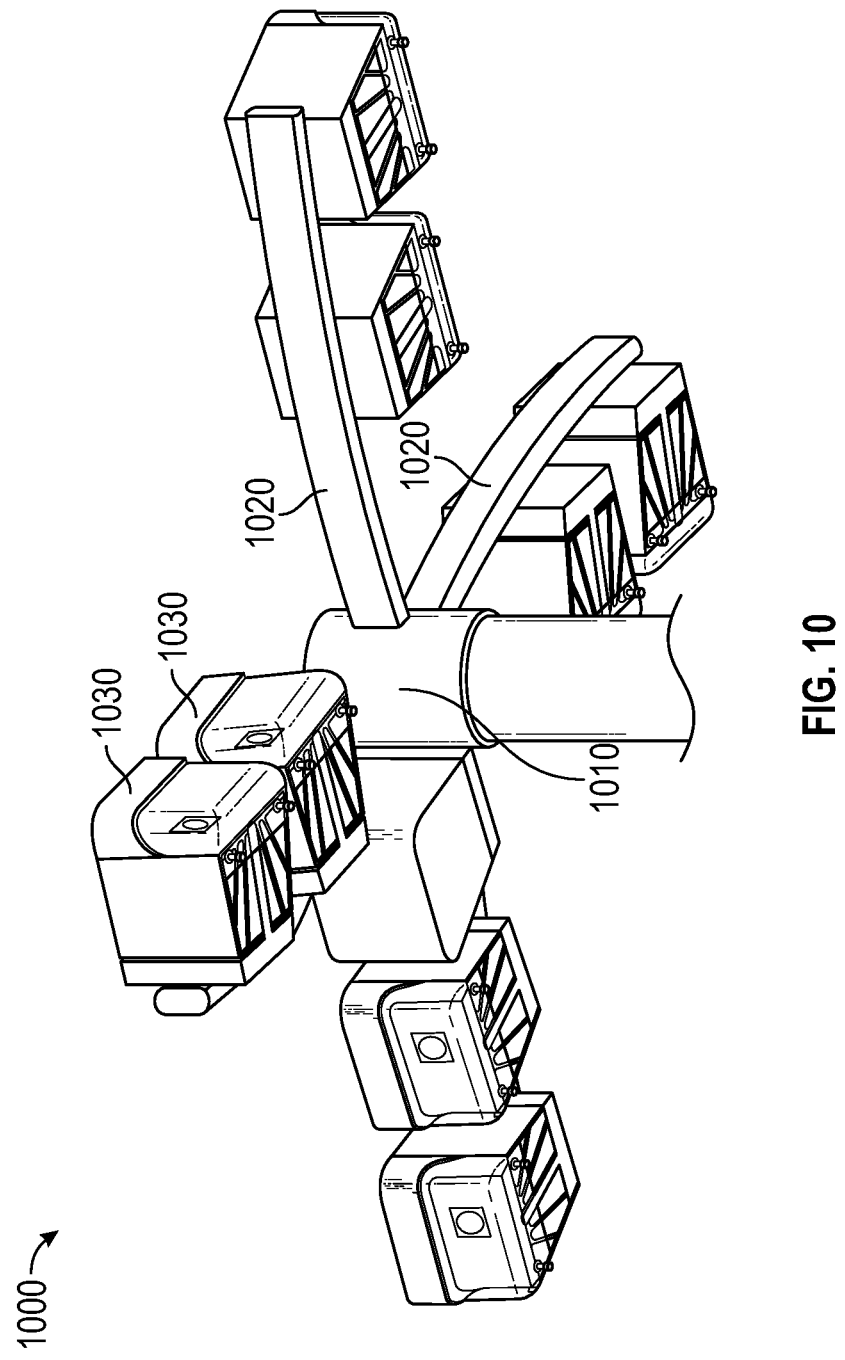
FIG. 10 is a perspective view of a street lighting system according to an embodiment of the invention.

Referring now to FIG. 10, an alternative embodiment of the invention is presented. A modular street lighting system 1000 comprises an attachment structure 1010, a plurality of support structures 1020, a plurality of lighting components 1030, and an electrical component housing 940. The modular street lighting system 1000 is similar to the modular street lighting system 900 depicted in FIG. 8, with the exception of where the modular street lighting system 900 comprised three support structures 920 and six lighting components 930, the present embodiment comprises four support structures 1020 and eight lighting components 1030. In each embodiment, the lighting components 930, 1030 are equally distributed among the support structures 1020. An unequal distribution of lighting components 930, 1030 is contemplated and included within the scope of the invention. Additionally, any number of support structures 1020 and lighting components 1030 is contemplated and included within the scope of the invention. Furthermore, while the support structures 1020 are evenly distributed about the attachment structure 1010, an uneven distribution of the support structures 1020 is contemplated and included within the scope of the invention.

Figure 11:
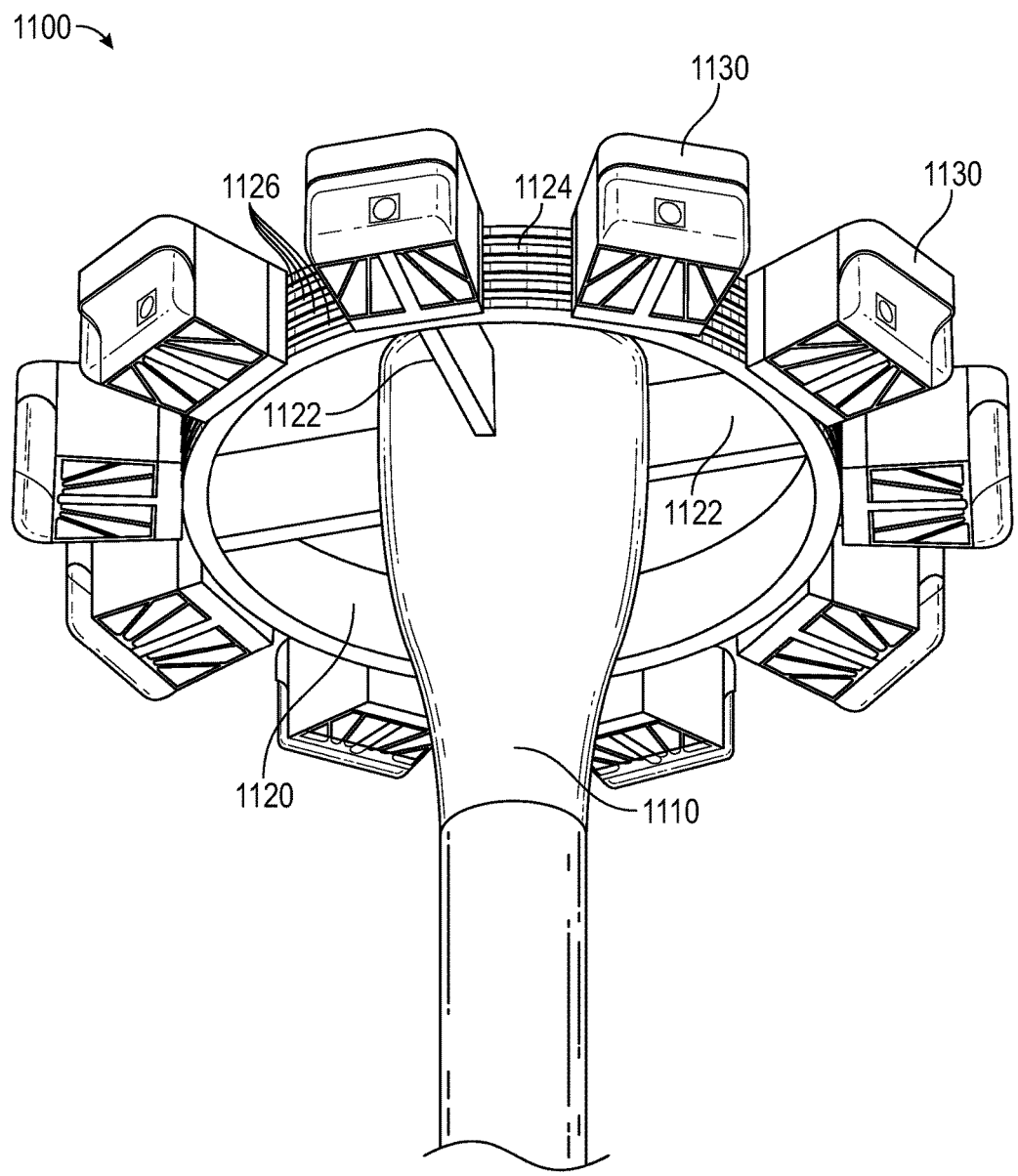
FIG. 11 is a perspective view of a street lighting system according to an embodiment of the invention.

Referring now to FIG. 11, an alternative embodiment of the invention is presented. A modular street lighting system 1100 may comprise an attachment structure 1110, a support structure 1120, and a plurality of lighting components 1130. The support structure 1120 may comprise a plurality of support arms 1122 attached to and extending outwardly from the attachment structure 1110. The support structure 1120 may further comprise a lighting attachment section 1124. The lighting attachment section 1124 may be configured to facilitate the attachment of lighting components 1130 to the support structure 1120. In the present embodiment, the lighting attachment section 1124 may comprise a plurality of recessed sections 1126. The plurality of recessed sections 1126 may be configured to cooperate with a structure of a lighting component 1130 to enable attachment therebetween. Additionally, the lighting attachment section 1124 may further be configured to establish an electrical connection with a lighting component 1130 when the lighting component 1130 is attached to the attachment section 1124. In some embodiments, one or more electrical connectors may be positioned within the recessed sections 1126. The electrical connectors may be configured to cooperate with corresponding electrical connectors associated with the lighting component 1130 to establish an electrical connection thereby. In some embodiments, the electrical connectors of the attachment section 1124 may be exposed to environmental factors. In such embodiments, the electrical connectors may be configured to be resistant to environmental factors, protecting against corrosion, rust, or other deleterious conditions resulting from such exposure.

In the present embodiment, the lighting attachment section 1124 may be generally circular. This may enable the positioning of a lighting component 1130 at any angular position around the modular street lighting system 1100, allowing for light to be emitted therefrom in any direction generally outward at least from a plane defined by the support structure 1120.

Figure 12:
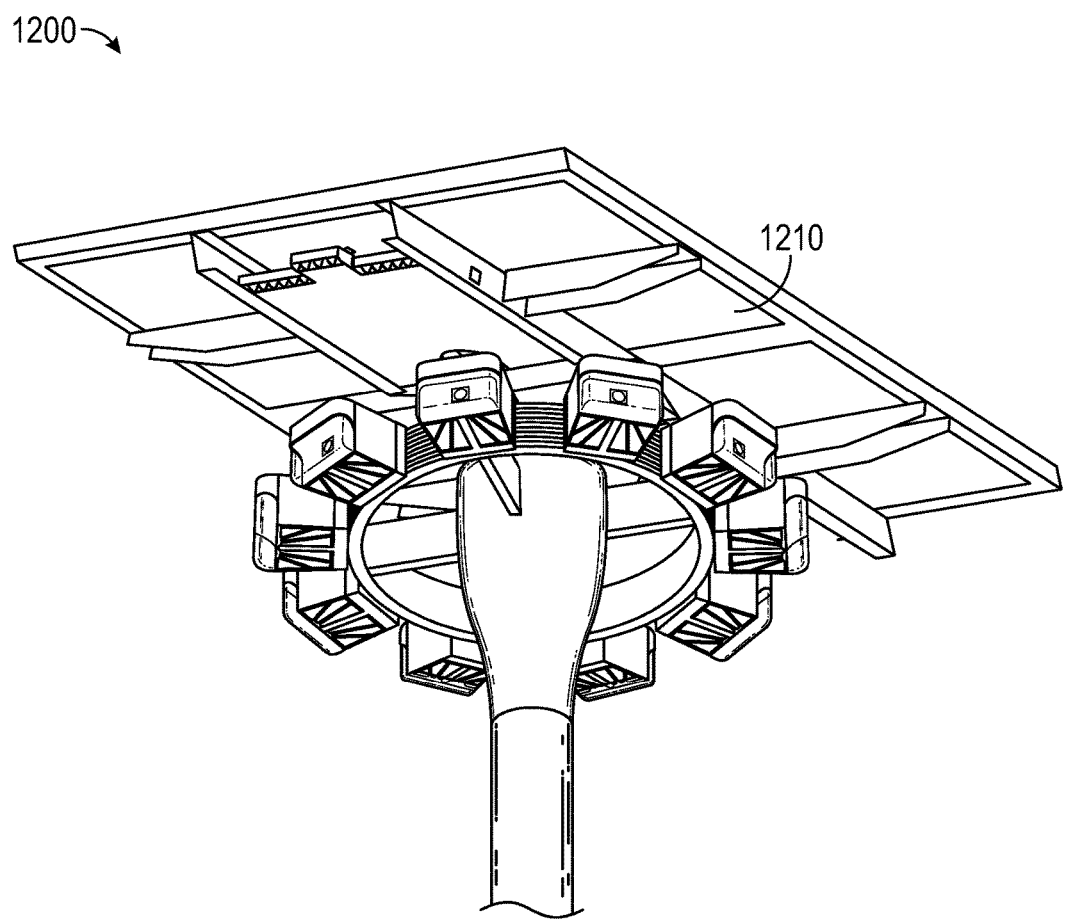
FIG. 12 is a perspective view of a street lighting system according to an embodiment of the invention.

Referring now to FIG. 12, another embodiment of the invention is presented. A modular street lighting system 1200 substantially similar to the modular street lighting system 1100 of FIG. 11, with the addition of a power generating component 1210 similar to those presented in FIGS. 1 and 5.

Referring now to FIGS. 13-21, an alternative embodiment of a lighting component of the present invention is depicts. The lighting component 1300 may comprise a rear attachment section 1310, a circuitry housing 1320, a body member 1330, an secondary optic 1340, an primary optic 1350, and a lighting element 1360. The rear attachment section 1310 may be configured to facilitate the attachment of the lighting component 1300 to another structure, for example and not by limitation, at least one of an attachment structure and a support structure of a modular street lighting system, and a standard street lamp boom.

The rear attachment section 1310 may be configured to attach to another structure with sufficient strength so as to enable the lighting component 1300 to be attached to and carried by the other structure. The rear attachment section 1310 may be attached to at least one of the circuitry housing 1320 and the body member 1330. Any means or method of attachment as are known in the art are contemplated and included within the scope of the invention, including, but not limited to, screw attachment. In the present embodiment, the rear attachment section 1310 may comprise a first set of screw holes 1312 positioned on an upper section 1313 of the rear attachment section 1310 configured to enable attachment to a structure of the lighting component 1300, and a second set of screw holes 1314 positioned on a lower section 1315 of the rear attachment section 1310 configured to enable attachment to another structure.

Figure 21:
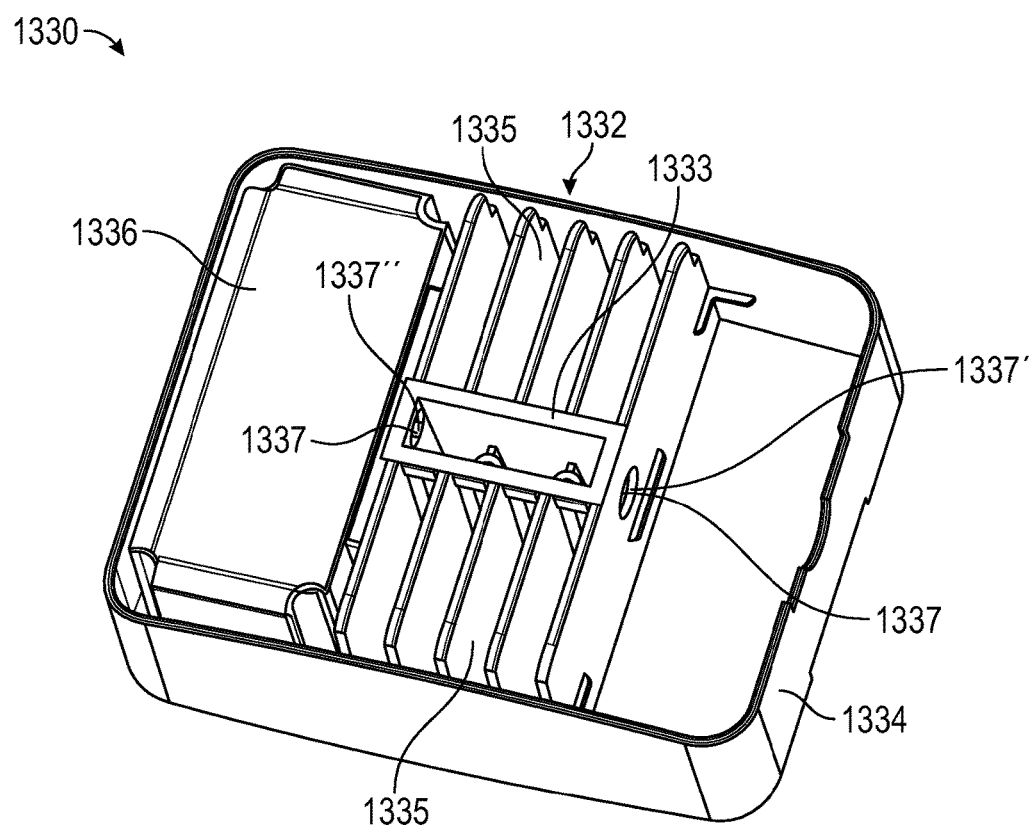
FIG. 21 is a top perspective view of a body member of the lighting component of FIG. 13 with a cap removed.

Referring now specifically to FIG. 21, the body member 1330 may comprise a center component 1332, a peripheral wall 1334, and a light source housing section 1336. The peripheral wall 1334 may generally circumscribe various structures of the lighting component 1300, such as, but not limited to or requiring, the circuitry housing 1320, the secondary optic 1340, the primary optic 1350, and the lighting element 1360.

Figure 13:
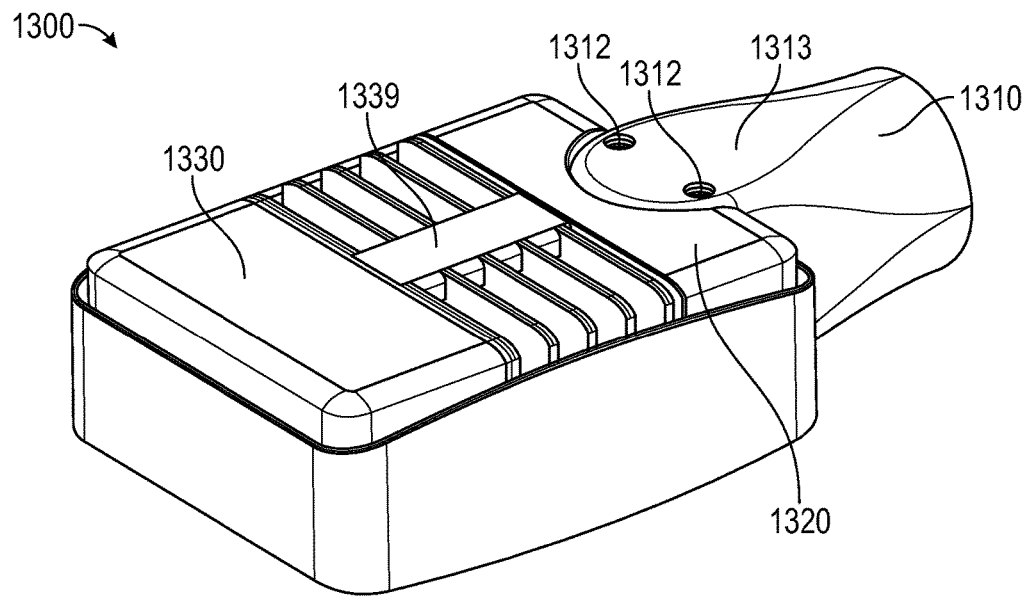
FIG. 13 is a perspective view of a lighting component according to an embodiment of the invention.

The center component 1332 may comprise a center structure 1333 and a plurality of heat dissipating structure 1335. The center structure 1333 may be configured to extend generally along a longitudinal axis of the lighting component 1330 and define a walled space therein. Furthermore, the center structure 1333 may include a plurality of apertures 1337 formed in opposing walls enabling the positioning of items therethrough. In some embodiments, an aperture 1337' may be formed in the center structure 1333 to permit an item to pass from a portion of the body member 1330 adjacent to the electrical housing 1320 into the walled space of the center structure 1333 and another aperture 1337" may be formed in the center structure 1333 to permit an item to pass from a void defined by the light source housing section 1336 into the walled space of the center structure 1333. Such an embodiment would permit. In such an embodiment, the plurality of apertures 1337 may enable an electrical connector, such as a wire, to pass from a portion of the body member 1330 adjacent to the electrical housing 1320, through the walled space of the center structure 1333, and into void defined by the light source housing section 1336, enabling the electrical connection between electrical elements in the respective portions of the lighting component 1300. Additionally, as can be seen in FIG. 13, the body member 1330 may further comprise a cap 1339 configured to shield the walled space of the center structure 1333.

The heat dissipating structure 1335 may comprise a plurality of walls extending outward from the center structure 1333. The plurality of walls may be configured in any orientation. In the present embodiment, they are oriented vertically. While not essential, a vertical orientation facilitates convective air flow between the plurality of walls. Additionally, the exposure of the heat dissipating structure 1335 to the environment surrounding the lighting component 1300 increases the thermal dissipation capacity thereof. Accordingly, the heat dissipating structure 1335 may be positioned in thermal communication with at least one heat-generating element of the lighting component 1300, including, but not limited to, the lighting element 1360 and the circuitry 1325.

The light source housing section 1336 may be configured to define a cavity therein, permitting other structures of the lighting component 1300 to be positioned therewithin, including, but not limited to, the lighting element 1360, the primary optic 1350, and the secondary optic 1340. More specifically, the light source housing section 1336 may be configured to permit the attachment of the aforementioned elements of the lighting component to be attached to the body member 1336 so as to be carried at least partially within the cavity defined by the light source housing section 1336. Additionally, the light source housing section 1336 may be configured to permit the attachment of the aforementioned elements so that they may cooperatively operate with one another.

Figure 16:
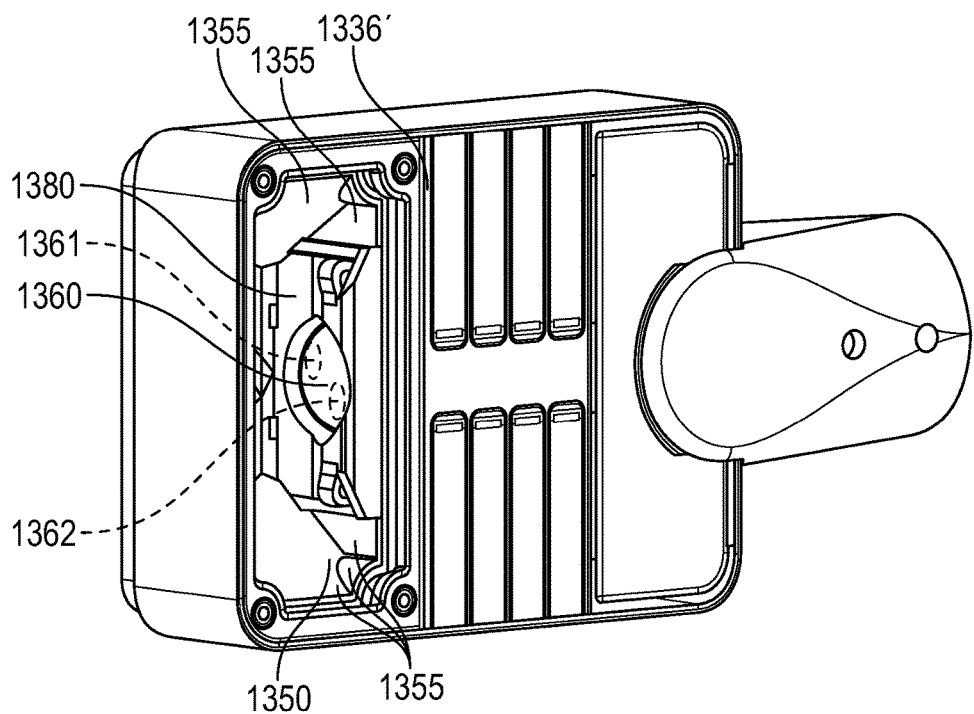
FIG. 16 is a bottom perspective view of the lighting component of FIG. 13 with a secondary optic removed.

Referring now to FIG. 16, the light source housing section 1336 may be configured to permit the lighting element 1360 to be attached to a back wall 1336' of the light source housing section 1336, positioning the lighting element 1360 in thermal communication therewith. Additionally, the back wall 1336' may be in thermal communication with the center component 1332, specifically, the plurality of heat dissipating structures 1335. Accordingly, the attachment of the lighting element 1360 to the back wall 1336' may cause heat generated by the lighting element 1360 to the plurality of heat dissipating structures 1335. This may facilitate reducing the operating temperature of the lighting element 1360, increasing the efficiency and longevity thereof. To maximize the thermal conduction, the back wall 1336' may have a generally reduced wall thickness relative to other parts of the body member 1330. Specifically, the back wall 1336' may have a thickness of approximately 0.125 inches, with thicknesses within the range from 0.0625 inches to 0.5 inches are contemplated and included within the scope of the invention. The back wall 1336' may be analogous to the proximal end of embodiments of lighting components hereinabove Additionally, the back wall 1336' may be connected to and in thermal communication with the peripheral wall 1334. In such embodiments, the peripheral wall 1334 may be configured to conduct heat away from the back wall 1336' and around the entire peripheral wall 1334, thereby reducing the concentration of heat in the back wall 1336', which has the concordant effect of increasing the total thermal dissipation capacity of the lighting component 1300 and reducing the operating temperature of the lighting element 1360.

In some embodiments, an inner surface of the light source housing section 1336 that defines the cavity may have a reflective coating applied thereto.

Figure 17:
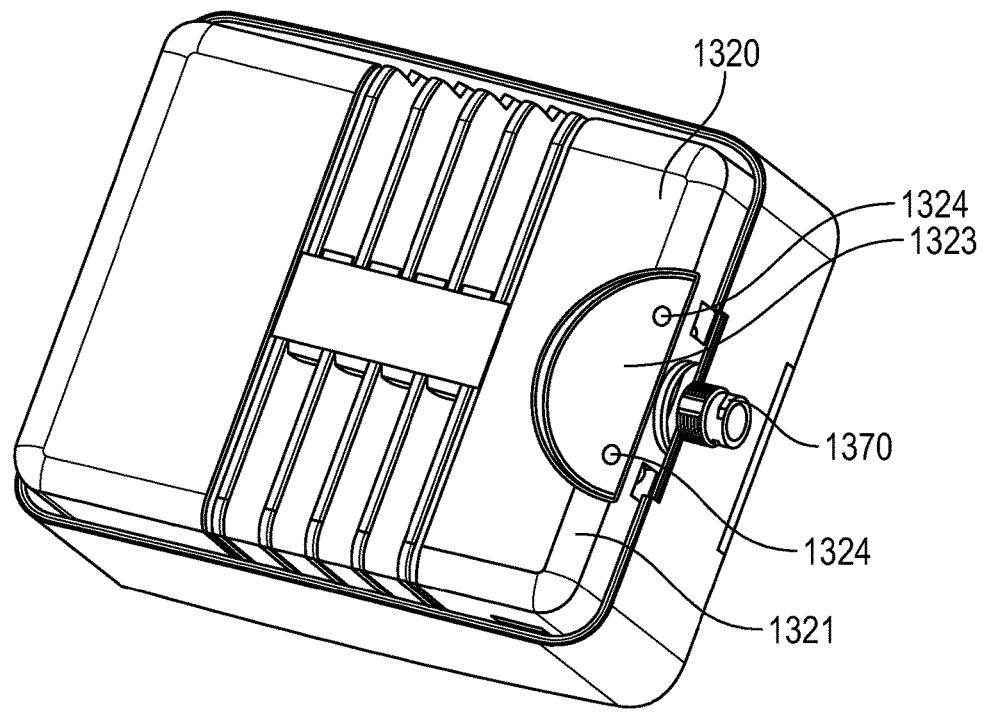
FIG. 17 is a top perspective view of the lighting component of FIG. 13 with a rear attachment section removed.
Figure 18A:
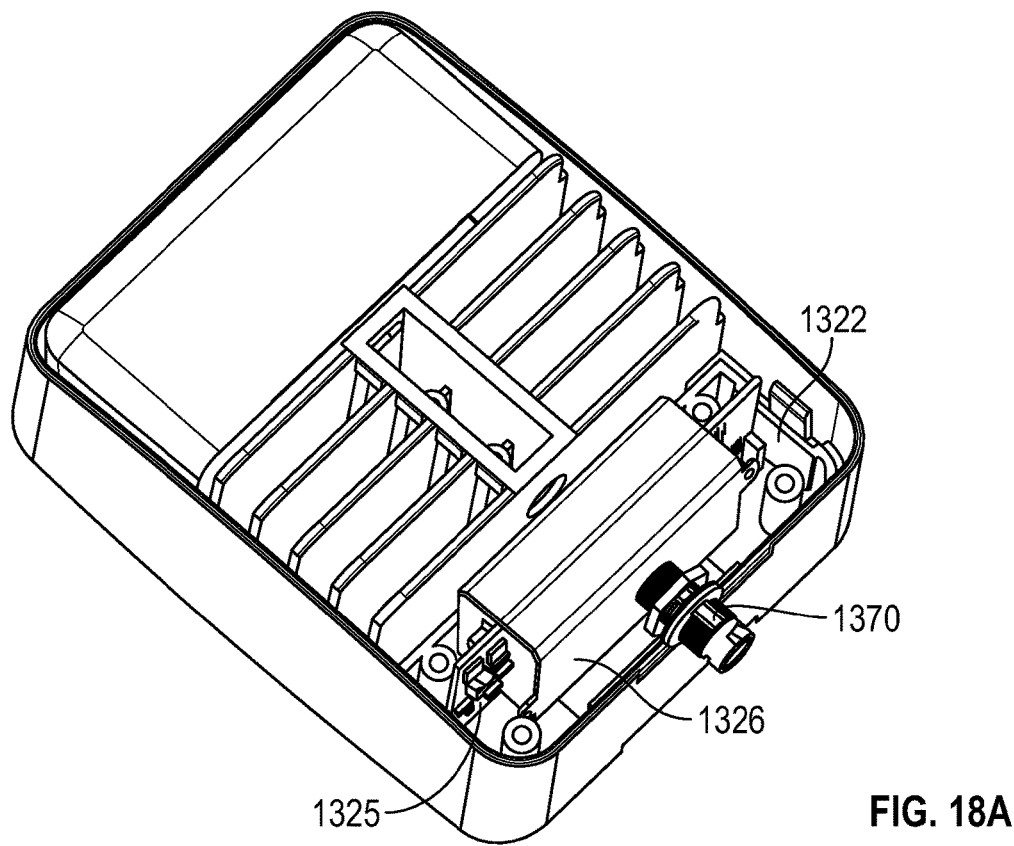
FIG. 18A is a top view perspective view of the lighting component of FIG. 13 with a rear attachment section and an upper outer housing of a circuitry housing removed.
Figure 18B:
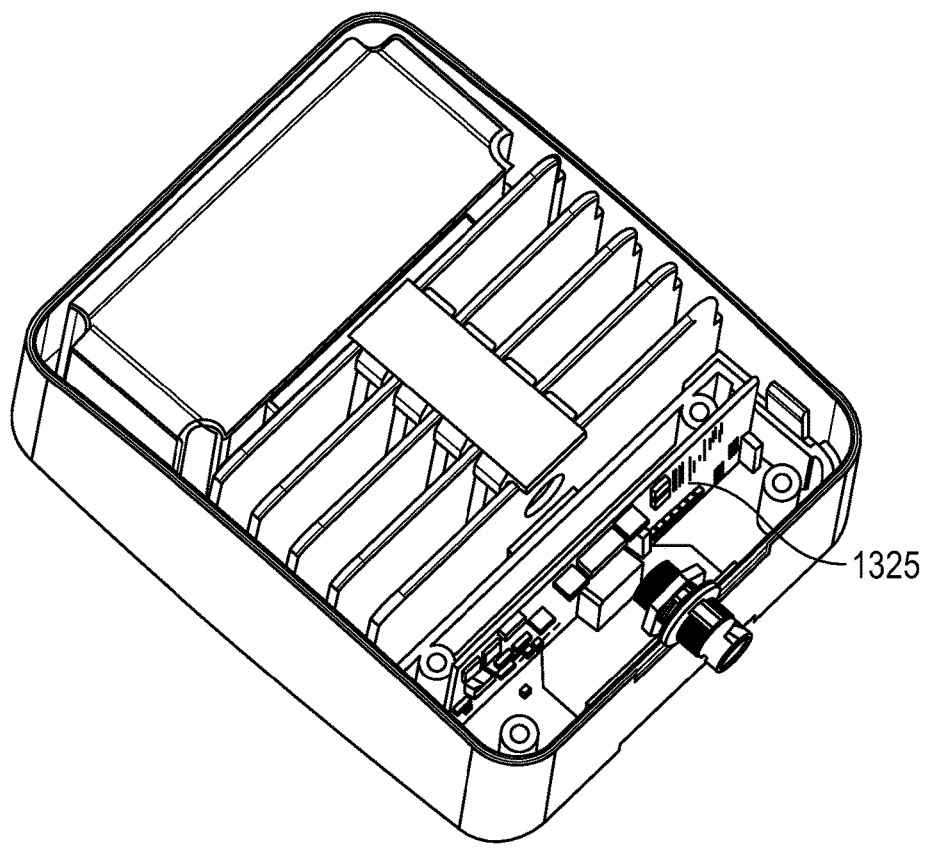
FIG. 18B is a top view perspective view of the lighting component of FIG. 13 with a rear attachment section, an upper outer housing of a circuitry housing, and an inner housing removed.

Referring now to FIGS. 17-18B, the circuitry housing 1320 will now be discussed in greater detail. The circuitry housing 1320 may be configured to be attached to and carried by at least one of the rear attachment section 1310 and the body member 1330.

The circuitry housing 1320 may comprise an upper outer housing 1321 and a lower outer housing 1322 that are attachable to one another by any means or method known in the art, including, but not limited to, slot-and-tab attachments. Furthermore, either or both of the upper and lower outer housings 1321, 1322 may comprise a recessed section 1323 configured to permit the rear attachment section 1310 to be positioned therewithin and be configured to attach to the rear attachment section 1310. In the present embodiment, a plurality of screw holes 1324 may be formed therein that cooperate with the screw holes 1314 of the rear attachment section 1310, such that a screw may pass through each.

Figure 20:
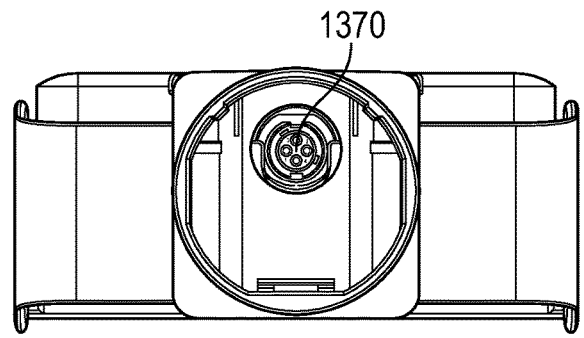
FIG. 20 is a rear view of the lighting component of FIG. 13.

Additionally, the upper and lower outer housings 1321, 1322 may cooperate to define an interior space and may further be configured to permit an electrical connector pass through a portion thereof, in the direction of the rear attachment section 1310. Specifically, an electrical connector 1370 may be positioned so as to pass between the upper and lower outer housings 1321, 1322 so as to be positioned partially within the interior space defined thereby, and partially without. This may facilitate the connection of electrical components within the circuitry housing 1320 with electrical elements outside that structure, as also shown in FIG. 20.

While upper and lower outer housings 1321, 1322 are shown, it is contemplated and included within the scope of the invention that two halves of a housing in orientation may be provided, and that any number of parts may cooperate to define the housing, including a single part.

The circuitry housing 1320 may further comprise circuitry 1325 positioned within the interior space defined by the upper and lower housings 1321, 1322. The circuitry 1320 may be configured to facilitate or perform any function associated with the lighting component 1300 specifically, or any other component of a modular street lighting system, including, but not limited to, power conditioning, communication across a network, control of a light source, control of a power generating component, and the like. The circuitry 1325 may be configured to connect to the electrical connector 1370 so as to establish an electrical connection outside the lighting component 1300 and/or outside a modular street lighting system, such as a grid power supply, and a computerized network, such as a wide area network or a traffic network. Other types of systems and networks that may be connected to are contemplated and included within the scope of the invention. In some embodiments, the circuitry 1325 may further comprise one or more sensors (not shown). The sensors may be configured to provide an indication of one or more environmental conditions, including, but not limited to, ambient light levels, including spectral power distributions of ambient light, temperature, vehicular traffic level, pedestrian traffic level, time of day, and the like.

The circuitry housing 1320 may further comprise an inner housing 1326 configured to enclose at least a portion of the circuitry 1325. The inner housing 1326 may be configured to provide additional environmental protection to certain elements of the circuitry 1325, or to isolate portions of the circuitry 1325 from other portions thereof, those isolated portions being shown in FIG. 18B. The inner housing 1326 may comprise a plurality of apertures (not shown) so as to enable electrical connection between the enclosed portion of the circuitry 1325 with other electrical elements of the lighting component 1300, including, but not limited to, the electrical connector 1370 and the lighting element 1360.

Figure 15:
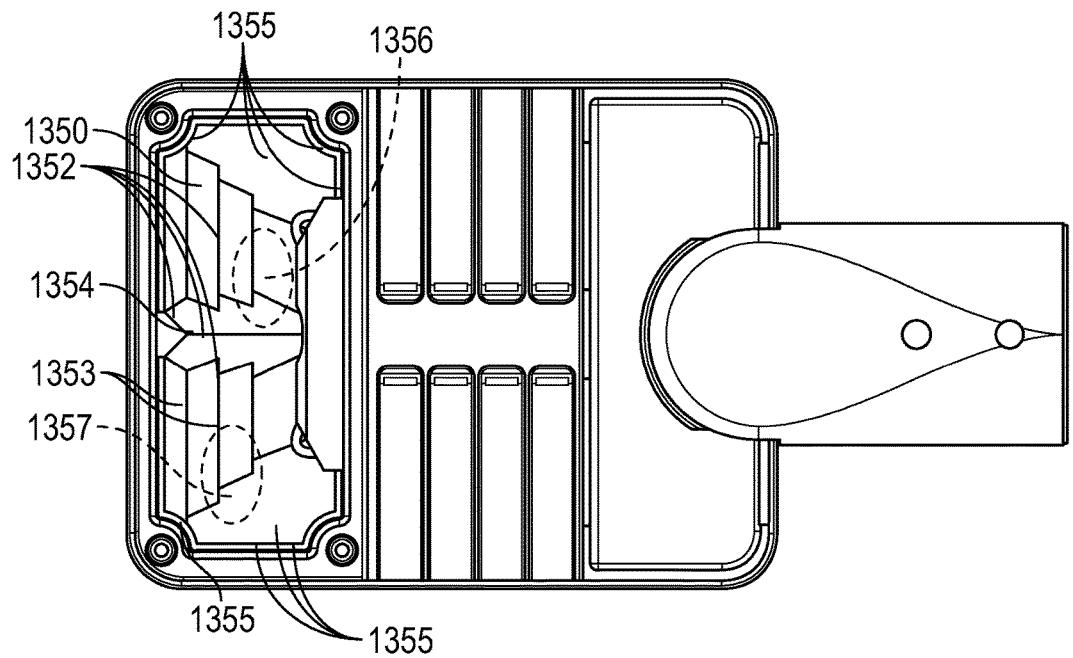
FIG. 15 is a bottom view of the lighting component of FIG. 13 with a secondary optic removed.
Figure 19:
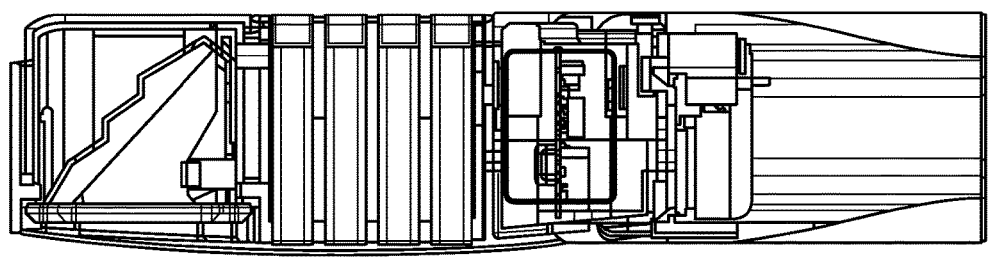
FIG. 19 is a side sectional view of the lighting component of FIG. 13.

Referring now to FIGS. 15-16 and 19, the lighting element 1360, the primary optic 1350, and the secondary optic 1340 will be discussed in greater detail. As recited above, the lighting element 1360 may be attached to the back wall 1336' of the light source housing section 1336 and may be electrically connected to another electrical component of the lighting component 1300, for example, the circuitry 1325.

The lighting element 1360 may be any device that is known to emit light, as described hereinabove. In the present embodiment, the lighting element 1360 may comprise an array of LEDs.

The lighting element 1360 may be configured to emit light generally hemispherically. The hemisphere in which light is emitted may be generally in a direction that is normal to a surface of the lighting element 1360. In the present embodiment, the lighting element 1360 may emit light such that a pole of the hemisphere is generally away from the rear attachment structure 1310 and parallel to a longitudinal axis of the lighting component 1300. Furthermore, the lighting element 1360 may be configured and/or oriented so as to emit light in the direction of at least one of the primary optic 1350 and the secondary optic 1340. In some embodiments, the lighting component 1300 may comprise a tertiary optic 1380 positioned immediately adjacent the lighting element 1360 to refract and/or collimate light emitted thereby in a desired direction, such as in the direction of at least one of the primary optic 1350 and the secondary optic 1340. The lighting element 1360 may emit light of various spectral power distributions, as is described in patent applications references herein.

The primary optic 1350 may be configured to reflect and/or refract light emitted by the lighting element 1360. In the present embodiment, the primary optic 1350 may be reflective. Furthermore, the primary optic 1350 may comprise a plurality of features 1352 to redirect light in the direction of the secondary optic 1340. The plurality of features 1352 may comprise one or more lateral ridges 1353 and one or more longitudinal ridges 1354. The plurality of features 1352 may advantageously reflect light in the direction of the secondary optic 1340. Furthermore, the plurality of features 1352 may reflect light in the direction of the secondary optic 1340 so as to have a desired distribution upon transmission through the secondary optic 1340, resulting in a desired distribution of light from the lighting component 1300.

In some embodiments, additional sections 1355 of the primary optic 1350 may cover multiple or all faces of the inner surface of the light source housing section 1336. Furthermore, the primary optic 1350 may be configured to cover a substantial portion of the inner surface of the light source housing section 1336, for example, the entire inner surface of the light source housing section 1336 except for the area adjacent the lighting element 1360.

In some embodiments, the lighting element 1360 may be configured to comprise a plurality of LEDs configured to emit light in differing wavelength ranges. Furthermore, the circuitry 1325 may be configured to emit light having differing spectral power densities by selectively operating differing combinations of LEDs of the lighting element. This may result in the light emitted by the lighting component 1300 having a perceptibly different color and/or having differing biological effects. Additional information regarding controlling the spectral power distribution of light may be found in U.S. patent application Ser. No. 13/737,606 titled Tunable Light System and Associated Methods filed Jan. 9, 2013, the content of which is incorporated by reference herein in its entirety, to the extent disclosure therein is consistent with disclosure herein.

Additionally, the light emitted by the lighting element 1360 may be controlled so as to effect a differing distribution of light emitted by the lighting component 1300. For example, a first plurality of LEDs 1361 within a first region of the lighting element may be independently operable from the other LEDs of the lighting element 1360. The light emitted by the first plurality of LEDs 1361 may be configured to emit light in a first direction, so as to be reflected by a first section 1356 of the primary optic 1350. Due to the location, angle, and inclusion of features of the first section 1356 of the primary optic 1350, the light emitted from the lighting component 1300 that is reflected from the first section 1356 may have a first distribution. A second plurality of LEDs 1362 within a second region of the lighting element 1360 may similarly be independently operable from the other LEDs of the lighting element 1360, including the first plurality of LEDs 1361. Additionally, light emitted by the second plurality of LEDs 1362 may be reflected by a second section 1357 of the primary optic 1350. The second section 1357 of the primary optic 1350, due to its location, angle, and inclusion of features, may have a second distribution that may be different from the first distribution. Accordingly, the distribution of light from the lighting component 1300 may be controlled by the selective operation of different plurality of LEDs of the lighting element 1360. Accordingly, the circuitry 1325 may be configured to operate each of the first and second pluralities of LEDs 1361, 1362 independently so as to cause the lighting component 1300 to emit light having different distributions.

While two pluralities of LEDs are depicted, any number of pluralities of LEDs, with attending differing distributions, are contemplated and included within the scope of the invention. Moreover, each plurality of LEDs may include LEDs having differing emission characteristics, including differing wavelength ranges. This may enable the lighting component 1300 to emit light having differing spectral power distributions at different regions in the light distribution emitted by thereby. Such an embodiment advantageously permits the adjustment of the distribution and spectral content of light emitted thereby without requiring changes in optics associated therewith.

Additionally, in some embodiments, the circuitry 1325 may be configured to alter the operation of the lighting element 1360 responsive to an input, for example, an indication of traffic levels in areas which are illuminated by light emitted by the lighting component 1300. Such indications may be received from a traffic monitoring network or from a traffic sensor, as described hereinabove. Accordingly, the circuitry 1325 may be configured to alter the distribution and spectral power distribution of light emitted by the lighting component 1300 responsive to the level of traffic.

Figure 14:
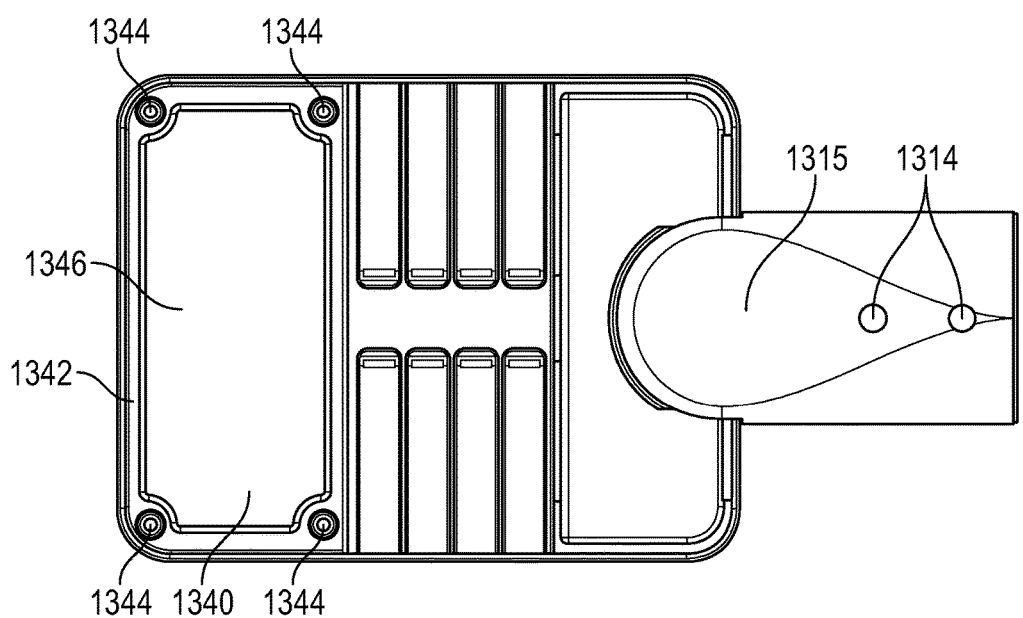
FIG. 14 is a bottom view of the lighting component of FIG. 13.

Referring now to FIG. 14, the secondary optic 1340 will now be discussed in greater detail. The secondary optic 1340 may be configured to be attached to and carried by the body member 1330, for example, at least one of the light source housing section 1336 and the peripheral wall 1334 by any means or method as is known in the art. In the present embodiment, the secondary optic 1340 may comprise a frame 1342 having a plurality of holes 1344 that may permit a fastener, such as a screw, to pass therethrough and cooperate with corresponding holes in the body member 1330. The attachment of the frame 1342 may retain an optically transmissive member 1346 in place so as to permit light to pass through the secondary optic 1340 while provide the protection described.

The secondary optic 1340 may be configured to shield the cavity of the light source housing section 1336, thereby preventing environmental contaminants from adversely affecting the emission of light out of the light source housing section 1336. Accordingly, the attachment of the secondary optic 1340 to the body member 1330 may establish a seal so as to prevent environmental contaminants from entering the cavity of the light source housing section 1336.

In some embodiments, the secondary optic 1340 may be configured to reflect, refract, or otherwise redirect light passing therethrough so as to result in the emission of light having a desired distribution.

In some embodiments, at least one of the primary optic 1350 and the secondary optic 1340, specifically the optically transmissive member 1346, may comprise a color conversion material, as described hereinabove. The color conversion material may be configured to absorb source light in a source wavelength range and emit light in a wavelength range that is different from the source wavelength range. In some embodiments, the color conversion material may be applied to any surface of at least one of the primary optic 1350 and the secondary optic 1340. In some embodiments, the color conversion material may be integrally incorporated with at least a portion of at least one of the primary optic 1350 and the secondary optic 1340.

Some of the illustrative aspects of the present, invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the description of the invention. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A modular street lighting system comprising:
   an attachment structure configured to attach to a street lamp pole;
   power circuitry positioned within the attachment structure and positioned in electrical communication with a power supply;
   a support structure extending outwardly from the attachment structure; and
   a lighting component that is configured to be attached to the support structure the lighting component comprising:
      an electrical housing proximate to the support structure,
      a light source housing section located distal to the support structure and to the electrical housing;
      a body member comprising a wall located proximal to the light source housing section defined as a proximal end wall and a plurality of heat dissipating structures extending from the proximal end wall,
   wherein the body member is positioned between the electrical housing and the light source housing section;
   wherein the attachment structure is configured to permit a plurality of support structures to be attached thereto;
   wherein the support structure is configured to permit a plurality of lighting components to be attached thereto; and
   wherein the lighting component is positioned in electrical communication with the power circuitry.

2. The modular street lighting system of claim 1 wherein the lighting component comprises:
   an electrical housing;
   a body member;
   a lighting element; and
   an optic;
   wherein the electrical housing is attached to the body member towards a distal end of the body member; and
   wherein the lighting element is attached to the body member towards a proximal end of the body member.

3. The modular street lighting system according to claim 2 wherein the electrical housing is configured to attach to the support structure.

4. The modular street lighting system according to claim 2 wherein the body member comprises a plurality of heat dissipating structures.

5. The modular street lighting system according to claim 4 wherein the plurality of heat dissipating structures are interior walls connected to exterior walls of the body member.

6. The modular street lighting system according to claim 4 wherein the plurality of heat dissipating structures are oriented vertically.

7. The modular street lighting system according to claim 4 wherein:
   the lighting element is attached to a proximal surface of the proximal end wall of the body member;
   the proximal end wall has a thickness of approximately 0.125 inches; and
   the plurality of heat dissipating structures are configured to permit fluidic flow across a distal surface of the proximal end wall of the body member.

8. The modular street lighting system according to claim 2 wherein the optic comprises a primary optic and a secondary optic.

9. The modular street lighting system according to claim 8 wherein the primary optic is configured to at least one of reflect and refract light in a direction generally orthogonal to a normal of a surface of the lighting element.

10. The modular street lighting system according to claim 2 wherein at least a portion of the optic comprises a color conversion material.

11. The modular street lighting system according to claim 1 further comprising:
   a pair of extension members; and
   an outer member attached to each of the pair of extension members;

wherein the lighting component is attached to the outer member.

12. The modular street lighting system according to claim 11 comprising a plurality of pairs of extension members and a plurality of lighting components; wherein an outer member is attached to each of the pair of extension members; and wherein a lighting component is attached to each outer member.

13. The modular street lighting system according to claim 1 wherein:
the support structure comprises a plurality of support arms extending from the attachment structure and a lighting attachment structure attached to the plurality of support arms; and
the lighting attachment structure is configured to permit a lighting component to be attached thereto.

14. The modular street lighting system according to claim 13 wherein:
the attachment structure is configured to permit a plurality of lighting devices attach thereto; and
the attachment structure is configured to permit at least one of the plurality of lighting devices attached thereto be attached so as to emit light in a direction that is different from a direction of light emitted by another lighting device of the plurality of lighting devices attached thereto.

15. The modular street lighting system according to claim 14 wherein the attachment structure is annular.

16. A lighting component for a modular lighting system, the lighting component comprising:
a light source housing section comprising:
a lighting element, and
an optic;
a body member comprising:
a wall located distal to the light source housing section defined as the distal end wall, and
a wall located proximal to the light source housing section defined as the proximal end wall; and
a plurality of heat dissipating structures attached to the proximal end wall that extend outwardly therefrom and attach to the distal end wall; and an electrical housing located distal to the light source housing section;
wherein the lighting element is attached to a proximal surface of the proximal end wall;
wherein the optic is configured to at least one of reflect and refract light in a direction generally orthogonal to a normal of a surface of the lighting element;
wherein the plurality of heat dissipating structures are configured to permit fluidic flow across a distal surface of the proximal end wall of the body member; and
wherein the body member is positioned between the electrical housing and the light source housing section.

17. The lighting component according to claim 16 wherein the plurality of heat dissipating structures are oriented vertically.

18. A lighting component for a street lighting system, the lighting component comprising:
an electrical housing;
a body member comprising:
a proximal end wall,
a distal end wall, and
a plurality of vertically oriented heat dissipating structures that extend from the distal end wall to the opposing proximal end wall; and
a light source housing section comprising:
a light source, and
an optic;
wherein circuitry is positioned within the electrical housing;
wherein a distal end wall of the body member abuts the electrical housing; and
wherein the light source housing section is positioned proximal of the body member proximal end wall;
wherein the light source housing section is positioned in thermal communication with the proximal end wall of the body member;
wherein the body member is positioned between the electrical housing and the light source housing section;
wherein the circuitry is in electrical communication with the lighting element and is configured to provide power for and control the operation of the lighting element;
wherein the lighting element is configured to emit light in a direction substantially parallel to the ground toward the optic;
wherein the optic is configured to reflect light in all directions between parallel and perpendicular to the ground.

19. The lighting component according to claim 18 wherein the optic is a primary optic, the lighting component further comprises a secondary optic; and wherein the primary optic is configured to reflect light emitted by the lighting element in the direction of the secondary optic.

20. The lighting component according to claim 18 wherein the light source housing section comprises a shield member to protect the light source from environmental factors and occlude light from emitting in the direction of the sky.

* * * * *